(12) United States Patent
Yokoi et al.

(10) Patent No.: US 8,706,714 B2
(45) Date of Patent: Apr. 22, 2014

(54) FILE AGGREGATION METHOD AND INFORMATION PROCESSING SYSTEM USING THE SAME

(75) Inventors: Kazuhito Yokoi, Yokohama (JP); Shoji Kodama, Yokohama (JP); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 243 days.

(21) Appl. No.: 13/265,209

(22) PCT Filed: Oct. 6, 2011

(86) PCT No.: PCT/JP2011/005633
§ 371 (c)(1),
(2), (4) Date: Oct. 19, 2011

(87) PCT Pub. No.: WO2008/069125
PCT Pub. Date: Jun. 12, 2008

(65) Prior Publication Data
US 2013/0091135 A1    Apr. 11, 2013

(51) Int. Cl.
*G06F 17/30* (2006.01)
(52) U.S. Cl.
USPC .......................................................... 707/707
(58) Field of Classification Search
CPC ........................... G06F 17/30; G06F 17/30091
USPC .................................. 707/687–689, 705–722
See application file for complete search history.

(56) References Cited

U.S. PATENT DOCUMENTS

| | | | |
|---|---|---|---|
| 7,953,219 B2 * | 5/2011 | Freedman et al. | 379/265.06 |
| 8,370,357 B1 * | 2/2013 | Gudmundsson et al. | 707/737 |
| 2002/0143797 A1 | 10/2002 | Zhang et al. | |
| 2005/0234891 A1 * | 10/2005 | Walther et al. | 707/3 |
| 2006/0212904 A1 * | 9/2006 | Klarfeld et al. | 725/46 |
| 2006/0224673 A1 * | 10/2006 | Stern et al. | 709/206 |
| 2007/0047845 A1 * | 3/2007 | Aoki et al. | 382/305 |
| 2008/0129298 A1 * | 6/2008 | Vaughan et al. | 324/322 |
| 2008/0133716 A1 * | 6/2008 | Rao et al. | 709/220 |
| 2008/0229217 A1 * | 9/2008 | Kembel et al. | 715/760 |
| 2010/0094803 A1 | 4/2010 | Yamakawa et al. | |
| 2010/0217663 A1 * | 8/2010 | Ramer et al. | 705/14.42 |
| 2011/0191321 A1 * | 8/2011 | Gade et al. | 707/709 |

FOREIGN PATENT DOCUMENTS

WO    2008069125 A1    12/2008

OTHER PUBLICATIONS

Gifford, D.K. et al., "Semantic File Systems", Operating Systems Review, ACM, New York, NY, US, vol. 25, No. 5, Jan. 1, 1991, pp. 16-25.

* cited by examiner

*Primary Examiner* — Wilson Lee
(74) *Attorney, Agent, or Firm* — Volpe and Koenig, P.C.

(57) ABSTRACT

The performance of the analysis system is deteriorated because file content extraction processing is performed in the file aggregation server and in the analysis server and further because annotation data creation is performed in the file aggregation server. Therefore, the present invention solves the problem by providing a file aggregation server classifying files into analysis target contents, non analysis target contents, and content matched data, and providing only the analysis target contents to the analysis server. Since this method enables the analysis server to acquire the analysis target contents directly from the file aggregation server, the processing of extracting contents from the files becomes unnecessary, and the throughput of the entire analysis system is improved.

11 Claims, 19 Drawing Sheets

Fig. 7

| Analysis server IP address | Analysis target content type |
|---|---|
| 192.168.0.2 | Text contents |
| 192.168.0.3 | Image contents |

Fig. 8

| Content extraction program name | Extraction target file format | Extracted contents |
|---|---|---|
| Presentation file extraction program | Presentation file | Text contents<br>Table contents<br>Image contents<br>Content matched data |
| Text file extraction program | Text file | Text contents<br>Table contents<br>Image contents<br>Content matched data |
| Spreadsheet file extraction program | Spreadsheet files | Table contents<br>Image contents<br>Content matched data |

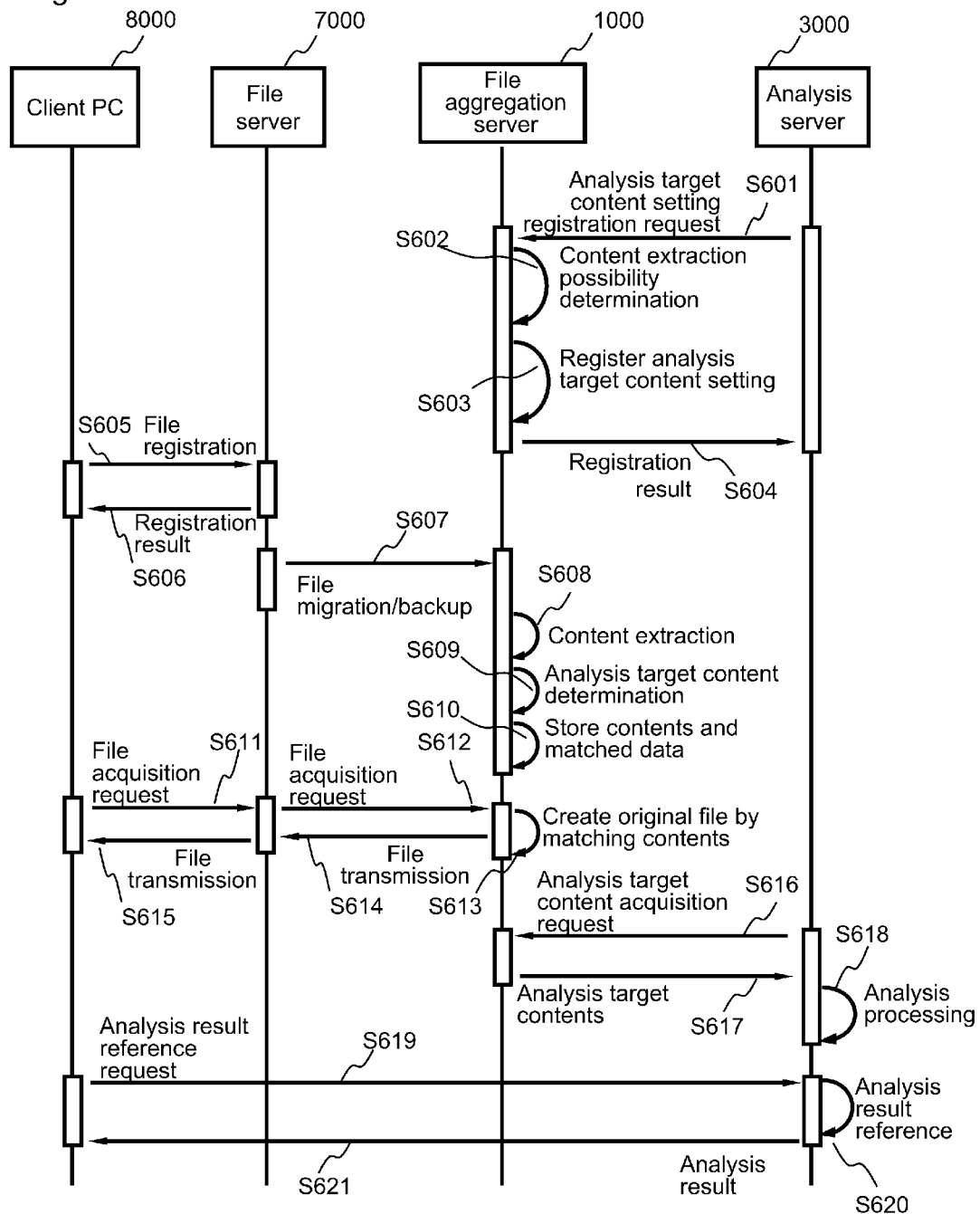

FILE AGGREGATION METHOD AND INFORMATION PROCESSING SYSTEM USING THE SAME

TECHNICAL FIELD

The present invention relates to a file aggregation method for aggregating files and contents of a server and others and an information processing system using the file aggregation method.

BACKGROUND ART

A file aggregation server which is the target of the present invention is a component of a content analysis system for analyzing contents in files in the file server. A server referred to as an analysis server which constitutes the core of the content analysis system acquires files in the file server and performs analysis processing for the contents inside the files. After the analysis processing, the analysis server provides a service enabling the user of the content analysis system to refer to the result of the analysis processing.

One form of the analysis server is a full-text search server which provides a service being able to search text contents inside files in the file server. After acquiring the files in the file server, the full-text search server extracts text contents inside the files and performs processing of creating an index for full-text search from the extracted text contents and the file location information.

After creating the index for full-text search, the full-text search server enables the search service which receives character string data to be used for the search from the user of the content analysis system and provides the search result stating the location information of the files including the received character string data. Furthermore, as other forms of the analysis server, a decision-making system, an image search server, and others using the contents inside the files in the file server can be named The file aggregation server in such a content analysis system is located between the file server and the analysis server and assumes a role of relaying the contents of the files and analysis target contents so that the analysis server can easily perform the analysis processing. The analysis server can also directly acquire the files in the file server when performing the analysis processing instead of utilizing the file aggregation server.

However, in such cases as where there are a significant amount of files as the target of the analysis processing and where the network online distance between the file server and the analysis server is extremely long, as it is more efficient in the perspective of processing throughput and others to comprise the files as the analysis processing target near the analysis server, normally, the file aggregation server is utilized.

Furthermore, for handling various needs for analysis, the content analysis system assumes various types of contents to be the target of analysis, which causes a plurality of analysis servers of different types to exist. In such a form of system, if individual analysis servers respectively acquire files from the file server, the resource of the file server and the resource of the network are wasted.

When utilizing a plurality of analysis servers, also for minimizing the resource usage amount of the entire system, a file aggregation server which aggregates files from the file server and provides the files and analysis target contents which the individual servers need is utilized. A conventional technology of the file aggregation server which is used so that the analysis server can easily perform the analysis processing is, for example, the Patent Literature 1. The Patent Literature 1 discloses the technology of annotation at the time of storing aggregated files so that the analysis server can easily identify the files including analysis target contents.

When a file aggregation server aggregates and stores a significant amount of files in the file server, the analysis server requires much time for identifying the files as the target of the analysis processing from the file aggregation server. Specifically speaking, if the analysis server assumes text contents to be the analysis target, for identifying the files including text contents, it is necessary to acquire all the files in the file aggregation server and check whether each of the files includes the text contents or not. Furthermore, another concrete example is that it is necessary to check the presence or absence of addition and update for all the files when the analysis server assumes only the files for which addition or update has been performed since the previous analysis processing to be the analysis target.

For solving such problems, when storing aggregated files, the file aggregation server in the Patent Literature 1 extracts such information as the internal contents from the files and stores the extracted information as annotation data. The annotation data of the files is additional information related to the aggregated files, such as the types of contents and last file update date and time information included in the files.

By referring to annotation data once instead of directly acquiring files in the file aggregation server, the analysis server identifies the files as the target of the analysis processing and indirectly acquires the identified files only. By using this technology, the time until the analysis server completes the acquisition of the files as the target of the analysis processing from the file aggregation server can be reduced. The reduction of this processing time enables up-to-date results of the analysis processing to be provided to the user of the content analysis system, which improves the convenience of the content analysis system.

CITATION LIST

Patent Literature

[PTL 1] Published PCT International Application No. WO2008/069125

SUMMARY OF INVENTION

Technical Problem

The conventional technology of the Patent Literature 1, which can significantly improve the convenience of the content analysis system, has two major problems. The first problem is that both the file aggregation server and the analysis server perform the same processing of extracting contents from the files. The file aggregation server performs the processing of extracting the contents inside the files for creating annotation data of the files. Meanwhile, the analysis server performs the processing of extracting the contents inside the files for acquiring the analysis target contents from the files identified by referring to the annotation data in the file aggregation server.

Since the processing of extracting the contents inside the files is performed twice in the content analysis system as explained above, the throughput of the analysis processing in the entire content analysis system can be improved if this processing is performed once. Specifically, this problem becomes notable if a plurality of analysis servers are used. This is because, as the individual analysis servers perform the processing of extracting the contents inside the files, the number of times of processing overlaps by the number of analysis servers and the number of file aggregation servers, which is one, in the entire content analysis system.

The second problem is that the file aggregation server also creates annotation data which is not used for identifying the analysis target contents by the analysis server. The file aggregation server does not comprise the function of ascertaining what type of contents the analysis server assumes to be the analysis target. Therefore, for being able to handle whatever contents the analysis server requests, the file aggregation server provides as much contents which can be extracted from the files as possible to the annotation data. Therefore, since the file aggregation server creates a large amount of annotation data which the analysis server does not need, the time for processing of creating annotation data and the storage area of annotation data are wasted.

Furthermore, even if the file aggregation server performs the processing of creating as much annotation data as possible, if a new file format which is unknown to the file aggregation server appears, the file aggregation server might be unable to extract the contents and create annotation data. In such case, unable to utilize the annotation data of the file aggregation server, the analysis server must acquire all the files in the file aggregation server and identify the files including the contents by using the content extraction program corresponding to the new file format which the analysis server comprises.

Therefore, the purpose of the present invention is to provide a file aggregation method and an information processing system using the same which can ensure (1) that only the file aggregation server performs the file content extraction processing without the analysis server performing the extraction processing and (2) that the file aggregation server does not perform the creation of annotation data which the analysis server does not use for identifying the analysis target contents.

Solution to Problem

For solving the above-mentioned problems, the file aggregation method and the information processing system using the same of the present invention perform the system configuration and analysis (extraction) processing below.

(a1) The file aggregation server comprises an analysis target content setting interface by which the analysis server can set the type of the analysis target contents and the content extraction program required for extracting the contents and a content provision interface by which the analysis server can acquire the analysis target contents, (a2) For the file aggregation server, the type of analysis target contents is set from the analysis server by way of the analysis target content setting interface before file aggregation.

(a3) The file aggregation server for which the type of analysis target contents is set analyzes the files at the time of file aggregation, classifies the files into three types, that is, analysis target contents, non analysis target contents, and content matched data, and stores the data respectively into the analysis target content store, the non analysis target content store, and the content matched data store.

(a4) If a content acquisition request is issued from the analysis server by way of the content provision interface, the file aggregation server transmits the analysis target contents stored in advance in the analysis target content store to the analysis server. The analysis server performs the analysis processing for the analysis target contents acquired from the file aggregation server without performing the conventional processing of extracting the analysis target contents from the files.

(a5) The file aggregation server does not comprise the area which stores the aggregated files as is, and maintains three data storage areas only, that is, the analysis target content store, the non analysis target content store, and the content matched data store.

(a6) In case of acquiring original files whose data was aggregated, the original files are created by using matched data from the file aggregation server and matching the analysis target contents with the non analysis target contents. The content matched data includes the data required for creating original files reversibly by matching the contents.

To be more specific, the present invention performs the processing below.

(b1) The full-text search server is used as the analysis server. If the analysis target is only the text contents among the presentation files including image contents and text contents, the full-text search server performs the setting that the text contents are the analysis target contents by way of the analysis target content setting interface of the file aggregation server.

(b2) After the setting, each time files are aggregated, the file aggregation server extracts contents from the presentation files and stores text contents in the analysis target content store, image contents in the non analysis target content store, and layout data in which the location of the text contents and image contents is described and file attribute information in the content matched data store.

(b3) After storing the data, if a content acquisition request is issued from the full-text search server (analysis server) by way of the content provision interface, the file aggregation server transmits the text contents stored in the analysis target content store to the full-text search server.

(b4) If the full-text search server requests presentation files by way of the content provision interface, the image contents and text contents are matched by using the content matched data, and the original files are created and transmitted.

Advantageous Effects of Invention

The present invention makes it unnecessary for both the analysis server and the file aggregation server to have to perform the processing of extracting the contents from the files. Furthermore, since only the file aggregation server performs the content extraction processing in the content analysis system, the throughput of the analysis processing in the entire content analysis system can be improved. As a result, the user of the content analysis system can acquire up-to-date results of the analysis processing by way of the analysis server. Specifically, if the analysis server is a decision-making system, the ability to acquire of up-to-date results of the analysis processing and immediately perform decision-making is important, and therefore the effect on the user of the content analysis system by the present invention is significant.

Furthermore, the present invention has other effects. The second effect is the ability to reduce the transfer amount between the file aggregation server and the analysis server. Although the files are transferred as is by the conventional technology, only the analysis target contents are transferred by the present invention, which reduces the transfer amount. For example, the size of the text contents included inside the office document files is approximately a fraction of the size of the original office document file in most cases. In such cases, by transferring only the text contents, the file aggregation server can reduce the transfer amount between the file aggregation server and the analysis server to a fraction of the previous amount.

The third effect is that the development man-hours of the analysis server can be reduced. By using the present invention, it becomes unnecessary to install a program of extracting contents from the files in the analysis server. Therefore, focusing only on developing programs of the analysis processing becomes possible in the development of the analysis server, which can reduce the development man-hours of the analysis server. Specifically, the effect of man-hour reduction becomes large if a plurality of analysis servers corresponding to various types of needs for analysis are developed individually.

BRIEF DESCRIPTION OF DRAWINGS

FIG. 7 is an analysis target content setting management table of the present invention.

FIG. 8 is a content extraction program management table of the present invention.

FIG. 20 is an operation sequence of the content analysis system in the Embodiment 4 of the present invention.

DESCRIPTION OF EMBODIMENTS

Hereinafter, the embodiments of the present invention are described with reference to the attached figures. However, these embodiments are merely examples for achieving the present invention, and are not intended to limit the technical scope thereof. Furthermore, the same reference number is assigned to the common configuration in the respective figures. One system to which the present invention is applied is a file aggregation server which ascertains the types of analysis target contents of the analysis server, manages the files at the time of file aggregation by classifying the files into analysis target contents, non analysis target contents, and content matched data, and provides the contents. The analysis processing throughput of the entire content analysis system can be improved by the file aggregation server. The system configuration and the aggregation (extraction) method are explained as needed below, but is not limited to the embodiment.

Embodiment 1

The Embodiment 1 is an embodiment which explains the basic components and operations of the present invention.

(1) Configuration of Content Analysis System

Figure 1:
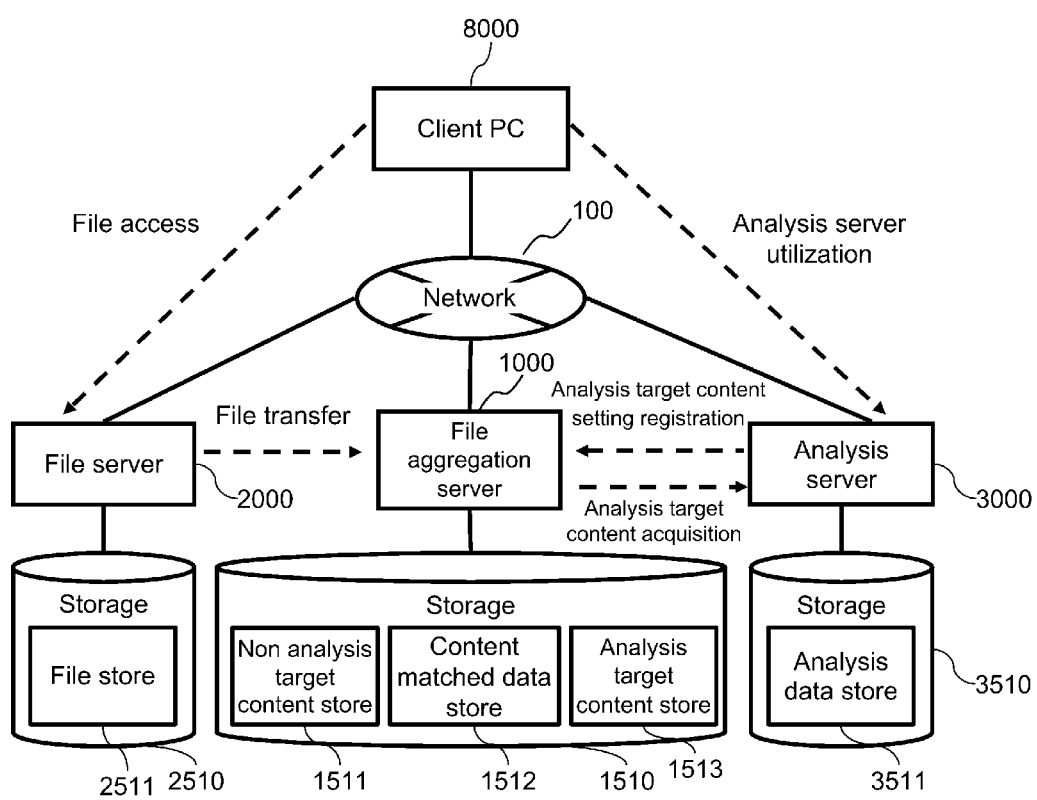
FIG. 1 is a configuration diagram of a content analysis system in the Embodiment 1 of the present invention.

FIG. 1 is a diagram showing the configuration of the content analysis system. In FIG. 1, 100 is a network, 1000 is a file aggregation server, 2000 is a file server, 3000 is an analysis server, and 8000 is a client PC.

The content analysis system is a system in which the analysis server 3000 analyzes the contents in the files which the file server 2000 manages. In this content analysis system, the file aggregation server 1000 assumes a role of aggregating the files in the file server 2000 and providing the analysis target contents and files to the analysis server 3000.

The network 100 is connected to the file server 2000, the client PC 8000, the analysis server 3000 and the file aggregation server 1000, and provides the mutual access function among the above. The network 100 in the system configuration of the present embodiment is LAN, WAN, and others, but not limited to the above.

The file aggregation server 1000 is a server which aggregates files stored in the file server 2000 and provides the acquired files and analysis target contents to the analysis server 3000 so that the analysis server 3000 can easily perform the analysis processing. A storage 1510 in the file aggregation server 1000 comprises internal data areas which are a non analysis target content store 1511, a content matched data store 1512, and an analysis target content store 1513.

The analysis target content store 1513 is an area which stores the contents which the analysis server 3000 assumes to be the analysis target among the file contents which the file aggregation server 1000 acquired from the file server 2000.

The non analysis target content store 1511 is an area which stores the contents which the analysis server 3000 does not assume to be the analysis target among the file contents which the file aggregation server 1000 acquired from the file server 2000.

The content matched data store 1512 is an area which stores the data to be used for matching the analysis target contents with the non analysis target contents. The content matched data is the data used for matching the analysis target contents with the non analysis target contents and creating original files before extracting the contents.

The file server 2000 is a server which manages files written from the terminal connected by the network 100 and, if requested by the terminals, provides the requested files. In this configuration, the files written by the client PC 8000 are managed, and the files are provided to the client PC 8000 and the file aggregation server 1000. A plurality of file servers 2000 may also exist in this configuration. A storage 2510 of the file server 2000 comprises an internal data area of a file store 2511. The file store 2511 is a data area which stores the files the client PC 8000, the analysis server 3000, and others access.

The analysis server 3000 is a server which analyzes the analysis target contents and files acquired from the file aggregation server 1000 and provides the service which enables the client PC 8000 to refer to the analysis result. The analysis target contents are, for example, text contents, image contents, and others.

As an example of the analysis server 3000, the full-text search server which provides the search service for the files including text contents in the file aggregation server 1000 can be named In the analysis processing in the full-text search server, text contents are extracted from the files, and an index for full-text search to be used for full-text search is created from the extracted text contents. A plurality of analysis servers 3000 of this type may also exist in this configuration.

A storage 3510 for the analysis server 3000 comprises an internal data area of an analysis data store 3511. The analysis data store 3511 is an area which stores the data which the analysis server 3000 creates by analyzing the contents acquired from the file aggregation server 1000. For example, if the analysis server 3000 is a full-text search server, the analysis data store 3511 is equivalent to the area which stores the full-text search index.

The client PC 8000 is a terminal used for the purpose of accessing the files which the file server 2000 shares and for the purpose of utilizing the analysis service which the analysis server 3000 provides. A plurality of client PCs 8000 may also exist in this configuration. Furthermore, although the client PC 8000 of this configuration is both for access of the file server 2000 and for access of the analysis server 3000, a client PC 8000 for the file server 2000 and a client PC 8000 for the analysis server 3000 may also be separately prepared and operated.

(1-1) Internal Configuration of File Aggregation Server

Figure 2:
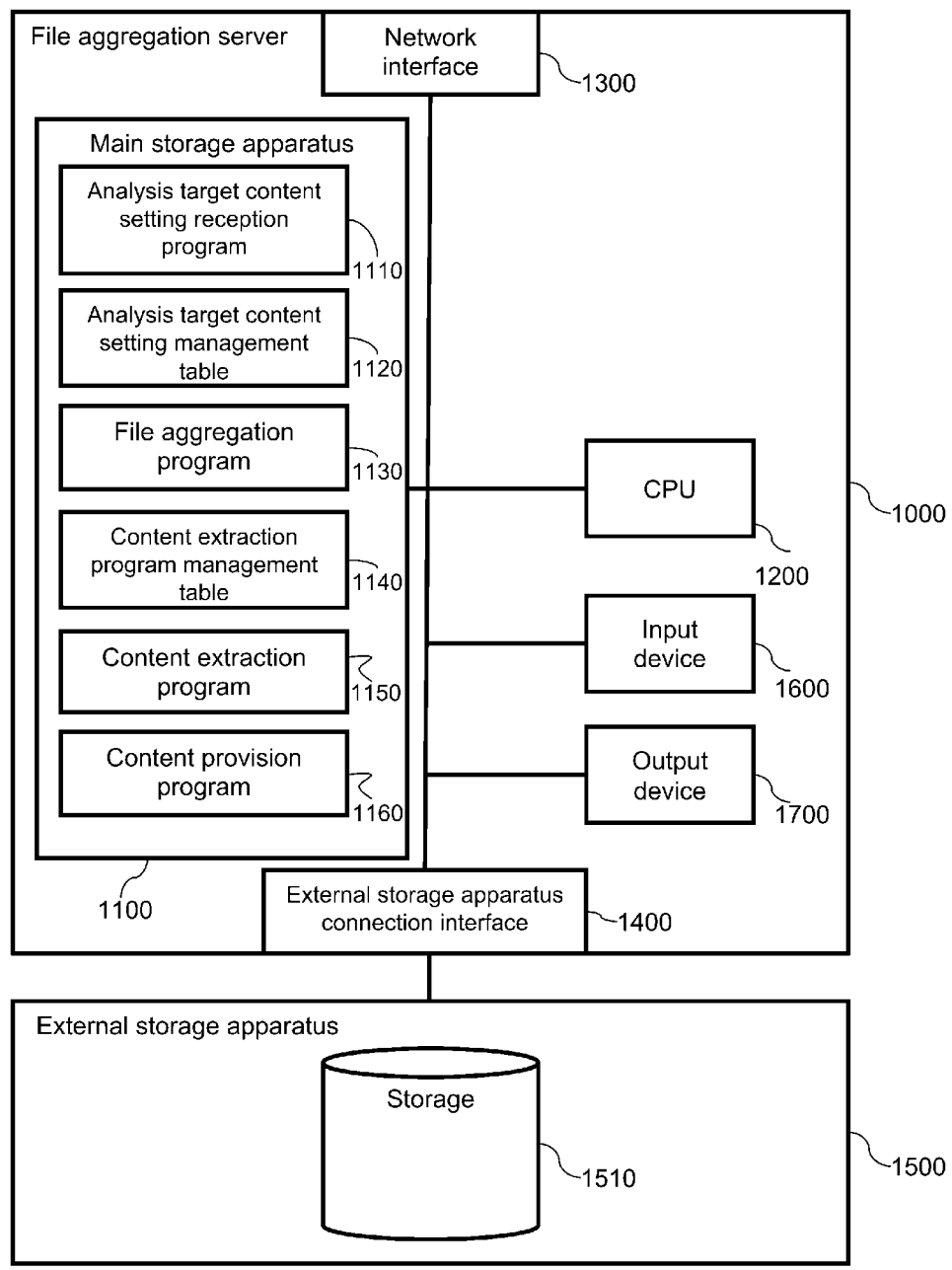
FIG. 2 is an internal configuration diagram of a file aggregation server in the Embodiment 1 of the present invention.

FIG. 2 is an internal configuration diagram of the file aggregation server 1000 which is one of the components of the content analysis system. The file aggregation server 1000 is configured of a main storage apparatus 1100, a CPU 1200, a network interface 1300, an external storage apparatus connection interface 1400, an input device 1600, and an output device 1700. These components are connected by an internal bus.

The main storage apparatus 1100 is equivalent to an actual memory and stores an analysis target content setting reception program 1110, an analysis target content setting management table 1120, a file aggregation program 1130, a content extraction program management table 1140, a content extraction program 1150, a content provision program 1160, and others.

The analysis target content setting reception program 1110 is a program which comprises an analysis target content setting interface and receives analysis target content setting requests from the analysis server 3000 by way of the above-mentioned interface. The analysis target content setting management table 1120 is a table which the file aggregation server 1000 uses for managing analysis target contents of the analysis server 3000.

The file aggregation program 1130 is a program which aggregates files stored in the file server 2000 and stores the files in the file aggregation server 1000. The content extraction program management table 1140 is a table which manages the file formats and the contents which can be extracted to which the programs which extracts contents from the files correspond.

The content extraction program 1150 is a program which, from the files which the file aggregation program 1130 acquires from the file server 2000 by way of the network interface 1300, extracts the contents included in the files.

The content provision program 1160 is a program which comprises an analysis target content provision interface and, if an analysis target content acquisition request is issued from the analysis server 3000, transfers the analysis target contents in the analysis target content store 1513 to the analysis server 3000 by way of the above-mentioned interface. Furthermore, if there is a file acquisition request before content extraction from a terminal in the network 100, the content provision program 1160 can refer to the content matched data, create an original file by matching analysis target contents with non analysis target contents, and transmit the above. It should be noted that the type information of the analysis target contents, data compression or decompression, data encryption or decryption, data format change, and others can be specified and acquired by the content provision interface.

The CPU 1200 is a component which processes the programs stored in the main storage apparatus 1100. The network interface 1300 is an interface connected to the network 100 and used for transmitting and receiving files and contents to and from the file server 2000 and the analysis server 3000. The input device 1600 is a data input means such as a keyboard and a mouse, and the output device 1700 is a means for outputting data to a display device such as a monitor, a printer, and others.

The external storage apparatus connection interface 1400 is an interface connected to an external storage apparatus 1500 and used for transmitting and receiving the data in the storage 1510. The external storage apparatus 1500 is an apparatus comprising the storage 1510 in which the file aggregation server 1000 stores the data under control. The storage 1510 is an apparatus comprising the analysis target content store 1513, the non analysis target content store 1511, and the content matched data store 1512 as data areas.

(1-2) Internal Configuration of File Server

Figure 3:
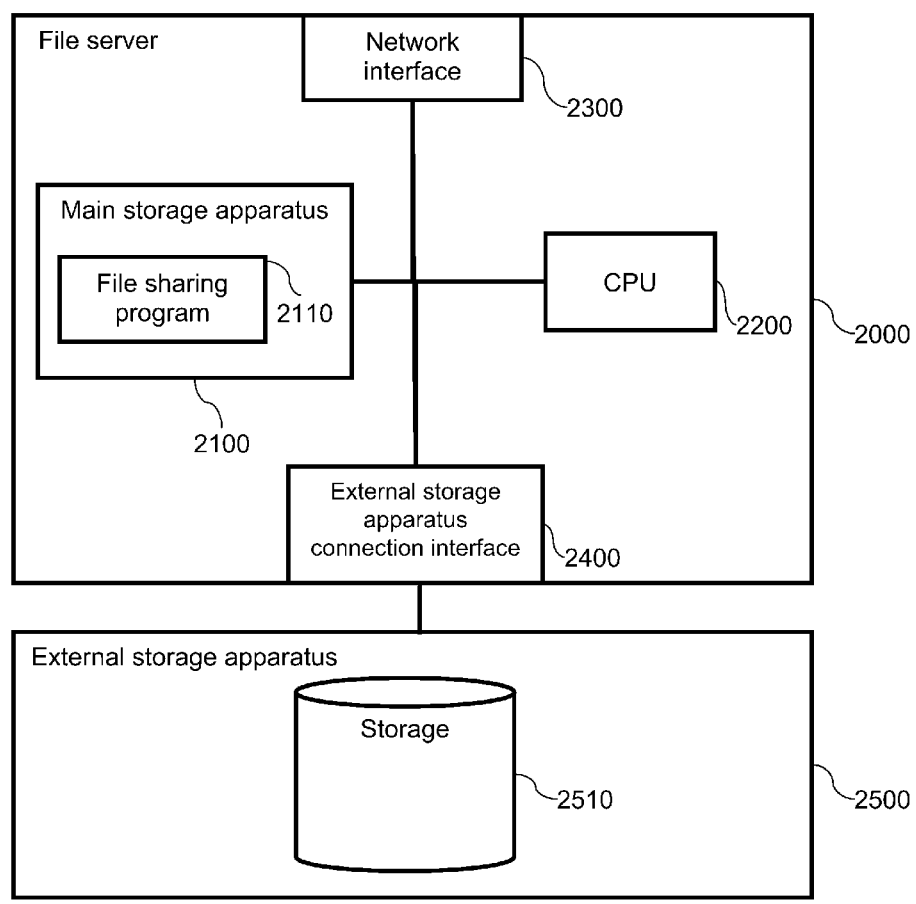
FIG. 3 is an internal configuration diagram of a file server in the Embodiment 1 of the present invention.

FIG. 3 is an internal configuration diagram of the file server 2000 which is one of the components of the content analysis system. The file server 2000 is configured of a main storage apparatus 2100, a CPU 2200, a network interface 2300, and an external storage apparatus connection interface 2400. These components are connected by an internal bus.

The main storage apparatus 2100 is equivalent to an actual memory and stores a file sharing program 2110. The file sharing program 2110 is a program which provides a file sharing service whereby file read and write can be performed for the files stored in the file store 2511 in the storage 2510 from such terminals connected to the network 100 as the client PC 8000 and the file aggregation server 1000.

The CPU 2200 is a component which processes the file sharing program 2110 stored in the main storage apparatus. The network interface 2300 is connected to the network 100 and used for transmitting and receiving files to and from the client PC 8000 and the file aggregation server 1000. The external storage apparatus connection interface 2400 is connected to an external storage apparatus 2500 comprising the storage 2510. The storage 2510 is an apparatus which comprises the data area of a file store 2511. Furthermore, although not shown in the figure, an input device 1600 or an output device 1700 may also be installed as in the file aggregation server 1000 in FIG. 2.

(1-3) Internal Configuration of Analysis Server

Figure 4:
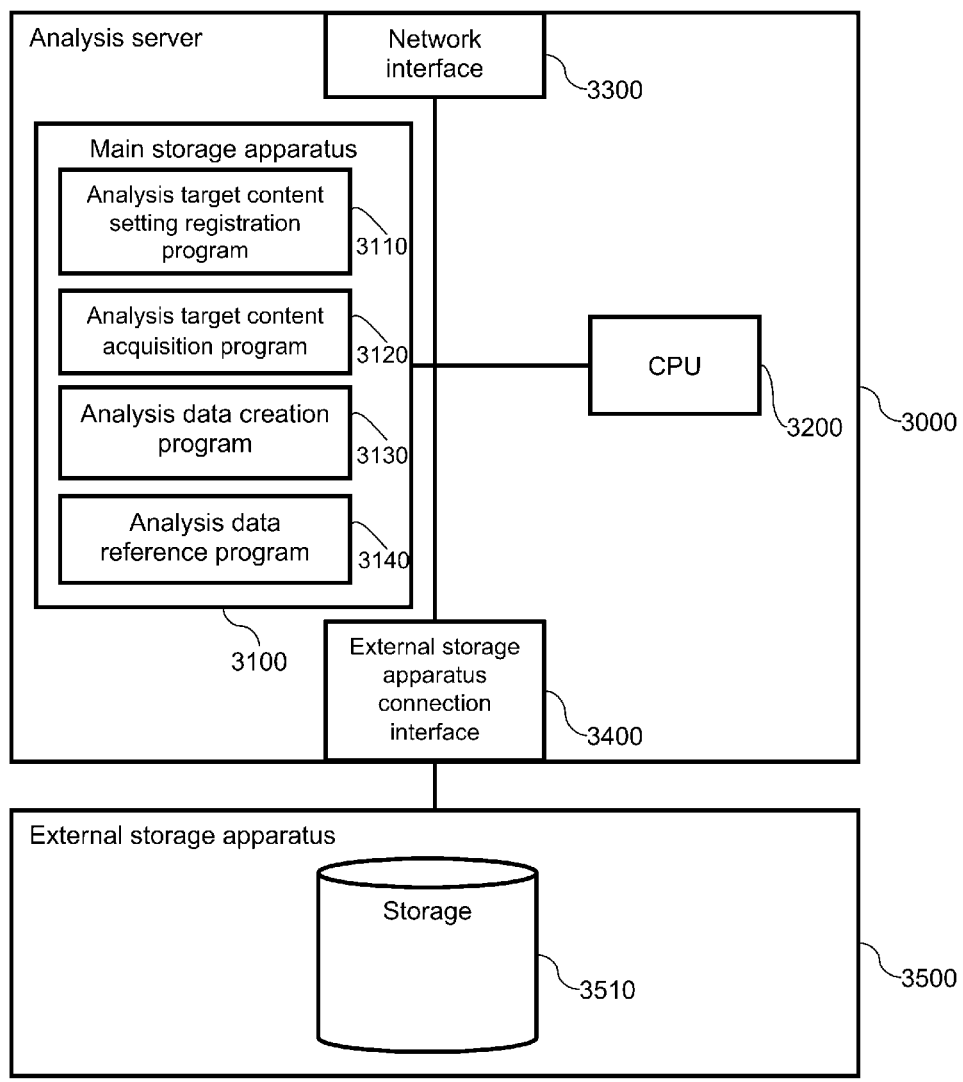
FIG. 4 is an internal configuration diagram of an analysis server in the Embodiment 1 of the present invention.

FIG. 4 is an internal configuration diagram of the analysis server 3000 which is one of the components of the content analysis system and analyzes the files and contents stored in the aggregation server. The analysis server 3000 is configured of a main storage apparatus 3100, a CPU 3200, a network interface 3300, and an external storage apparatus connection interface 3400. These components are connected by an internal bus.

The main storage apparatus 3100 is equivalent to an actual memory and stores an analysis target content setting registration program 3110, an analysis target content acquisition program 3120, an analysis data creation program 3130, and an analysis data reference program 3140. Furthermore, although not shown in the figure, an input device 1600 or an output device 1700 may also be installed as in the file aggregation server 1000 in FIG. 2.

The analysis target content setting registration program 3110 is a program which notifies the types of contents which the analysis server 3000 assumes to be the analysis target to the analysis target content setting interface in the file aggregation server 1000 before the analysis processing. The analysis target content acquisition program 3120 is a program which acquires the contents which the analysis server 3000 assumes to be the analysis target from the file aggregation server 1000.

The analysis data creation program 3130 is a program which analyzes the contents acquired from the file aggregation server 1000 and creates analysis data. If the analysis server 3000 is a full-text search server, the analysis data creation program 3130 is equivalent to the program which creates full-text search index data.

The analysis data reference program 3140 is a program which provides an interface for the client PC 8000 to refer to the data in the analysis data store 3511. For example, the program performs the processing of receiving a query which inquires about the analysis result from the client PC 8000, referring to the analysis data corresponding to the query, and returning the search result to the client PC 8000.

The CPU 3200 is a component which performs the processing by the analysis target content setting registration program 3110, the analysis target content acquisition program 3120, the analysis data creation program 3130, and the analysis data reference program 3140 which are stored in the main storage apparatus.

The network interface 3300 is connected to the network 100 and used for the purpose of acquiring the files and analysis target contents from the file aggregation server 1000 and for the purpose of receiving reference requests for analysis results from the client PC 8000.

The external storage apparatus connection interface 3400 is connected to the external storage apparatus 3500 comprising the storage 3510. The storage 3510 is an apparatus comprising the data area of the analysis data store 3511 which stores the analysis data created by the analysis data creation program 3130.

(1-4) Internal Configuration of Client PC

Figure 5:
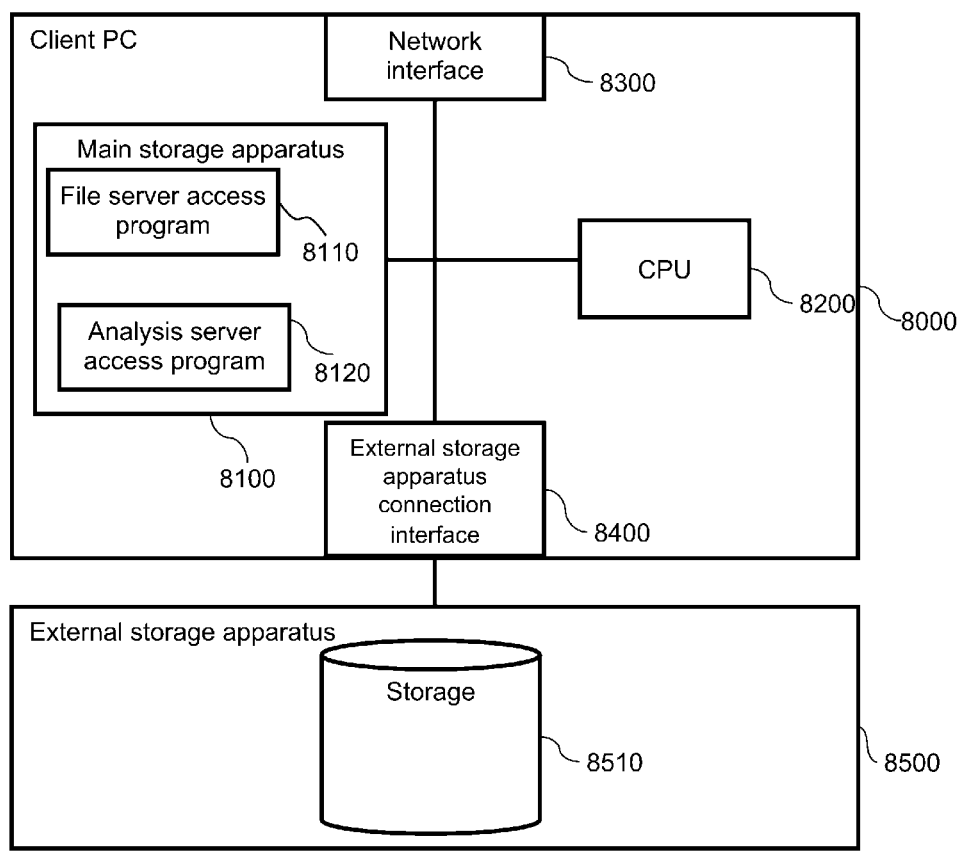
FIG. 5 is an internal configuration diagram of a client PC in the Embodiment 1 of the present invention.

FIG. 5 is an internal configuration of the client PC 8000 used for utilizing the file server 2000 and the analysis server 3000. The client PC 8000 is configured of the components which are a main storage apparatus 8100, a CPU 8200, a network interface 8300, and an external storage apparatus connection interface 8400. These components are connected by an internal bus. Furthermore, although not shown in the figure, an input device 1600, an output device 1700, and others are generally installed as in the file aggregation server 1000 in FIG. 2.

The main storage apparatus 8100 is equivalent to an actual memory and stores a file server access program 8110 and an analysis server access program 8120. The file server access program 8110 is a program used for reading and writing the files managed by the file server 2000 by way of the network interface 8300.

The analysis server access program 8120 is a program which receives queries for referring to analysis data from the user of the client PC 8000, inquires about the analysis server 3000, fixes the inquiry results in a format which is easy for the user to view, and displays the above.

The CPU 8200 is a component which performs the file server access program 8110 and the analysis server access program 8120 in the main storage apparatus 8100. The network interface 8300 is connected to the network 100 and is used for the purpose of transmitting and receiving files to and from the file server 2000 and for the purpose of referring to the analysis data in the analysis server 3000. The external storage apparatus connection interface 8400 is connected to the external storage apparatus 8500. The external storage apparatus 8500 is configured of the storage 8510 which stores the data required for the startup of the client PC 8000 and others.

(2) Operation Overview of Content Analysis System

Figure 6:
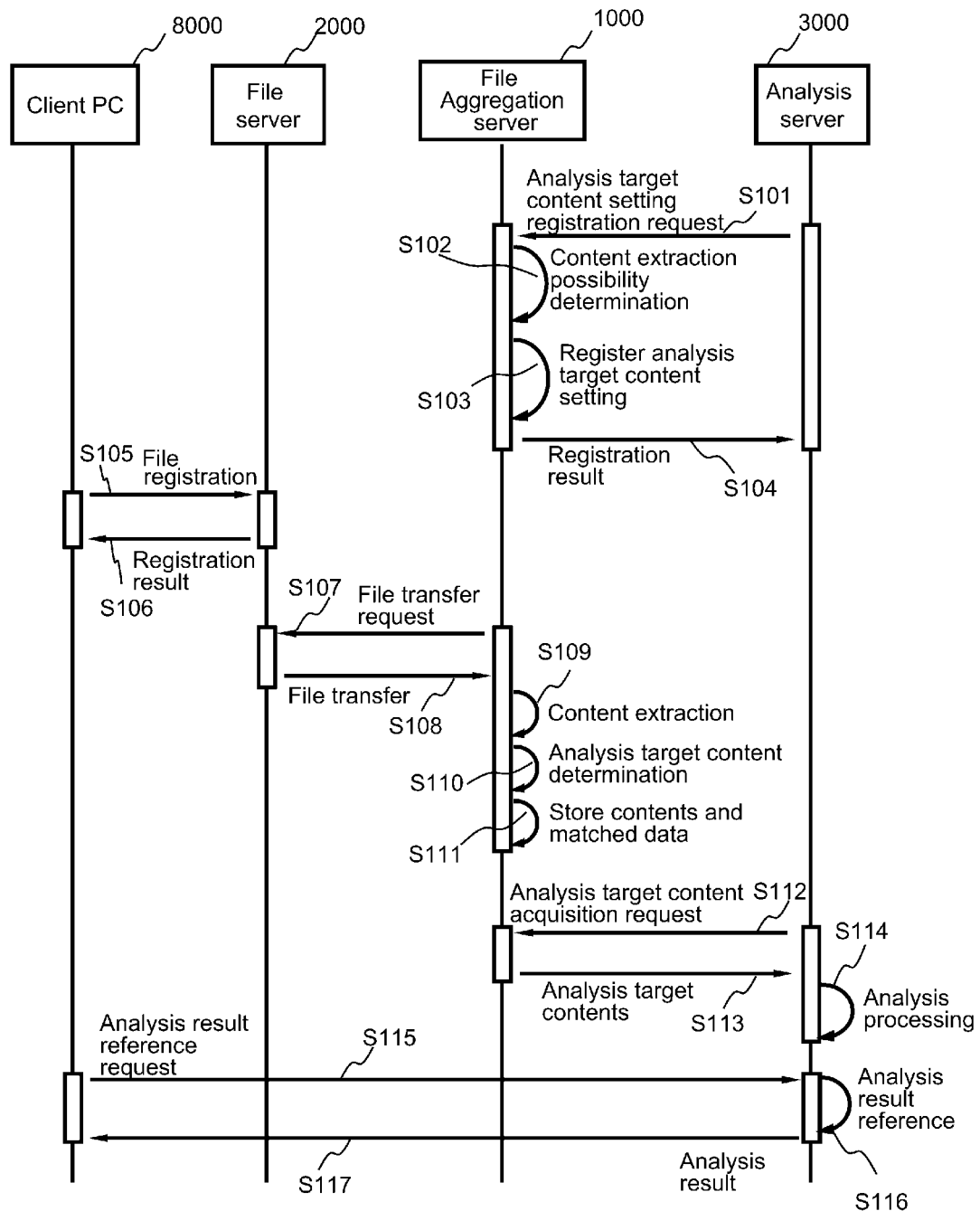
FIG. 6 is an operation sequence of the content analysis system in the Embodiment 1 of the present invention.

FIG. 6 is an operation sequence of the content analysis system configured of the client PC 8000, the file server 2000, the file aggregation server 1000, and the analysis server 3000. The operation sequence from processing S101 to processing S104 is the operation sequence which the analysis server 3000 sets the information of the analysis target contents in the file aggregation server 1000. Firstly, the analysis server 3000 transmits an analysis target content setting registration request to the analysis target content setting interface in the file aggregation server 1000 in processing S101.

Next, in accordance with the analysis target content type information included in the analysis target content setting request, the file aggregation server 1000 determines whether content extraction in the file aggregation server 1000 is possible or not (content extraction possibility determination processing S102). If content extraction is possible, the file aggregation server 1000 performs processing S103 of registering analysis target content setting. Finally, the file aggregation server 1000 performs processing S104 of transmitting the registration result which records whether the registration of the analysis target content setting succeeded or not to the analysis server 3000. Processing from S105 to S111 is an operation sequence until the file aggregation server 1000 stores the contents of the files created in the client PC 8000.

Firstly, if the content analysis system user performs the file registration operation by using the client PC 8000, the client PC 8000 issues a registration request (processing S105) of the created file to the file server 2000. Next, the file server 2000 performs file registration in accordance with the file registration request and performs processing S106 of transmitting registration result including the information whether file registration succeeded or not to the client PC 8000.

The file aggregation server 1000 performs processing S107 of transmitting a file transfer request for regularly synchronizing the files in the file server 2000 with the files in the file aggregation server 1000.

Next, in accordance with the file transfer request S107, the file server 2000 performs processing S108 of transmitting the files in the file server 2000 to the file aggregation server 1000. The files transmitted in this processing may be all the files in the file server 2000, but may preferably be only the files updated after the point of time at which the previous synchronization was performed.

Next, the file aggregation server 1000 performs processing S109 of extracting the contents and matched data from the acquired files. Subsequently, after performing processing S110 of determining whether the respective extracted contents are the analysis target contents or not, the file aggregation server 1000 performs processing S111 of storing the analysis target contents, the non analysis target contents, and the content matched data in the analysis target content store 1513, the non analysis target content store 1511, and the content matched data store 1512 respectively.

Processing from S112 to S114 is an operation sequence until the analysis server 3000 acquires the contents from the file aggregation server 1000 and performs the analysis processing.

Firstly, the analysis server 3000 performs processing S112 of transmitting an analysis target content acquisition request to the content provision interface in the file aggregation server 1000.

The file aggregation server 1000 acquires the analysis target contents prepared in advance from the analysis target content store 1513 and performs processing S113 of transmitting the contents to the analysis server 3000. Finally, the analysis server 3000 performs processing S114 of performing the analysis processing by using the acquired analysis target contents and creates analysis data.

Processing from S115 to S117 is an operation sequence in which the client PC 8000 utilizes the analysis result reference service provided by the analysis server 3000.

Firstly, the client PC 8000 receives an analysis result reference request from the content analysis system user and performs processing S115 of transmitting the analysis result reference request to the analysis server 3000.

Next, the analysis server 3000 performs processing S116 of referring to the analysis data in which the analysis result is stored in accordance with the request. Finally, finding the target analysis result which the client PC 8000 requests, the analysis server 3000 performs processing S117 of transmitting the result to the client PC 8000. Receiving the analysis result, the client PC 8000 fixes the analysis result in a format which is easy for the user to view and provides the result to the content analysis system user.

Hereinafter, the management tables used for the analysis target content setting registration processing of the file aggregation server 1000, the file storage processing of the file aggregation server 1000, and the content provision processing of the file aggregation server 1000 and the details of the respective processing operations are described.

(2-1) Analysis Target Content Setting Management Table

FIG. 7 is a diagram showing the analysis target content setting management table 1120. This is a table which the file aggregation server 1000 uses for managing the analysis target contents of the analysis server 3000. An "analysis server IP (Internet Protocol) address" 1121 is an IP address used for identifying the analysis server 3000 in which the analysis target content setting is registered. Although IP addresses are used as an example in this table, other types of information can be used if the analysis server 3000 can be identified by the information. Furthermore, a plurality of analysis servers 3000 can be specified as "192.168.0.*". In an "analysis target content type" 1122, a type of contents which the analysis server 3000 assumes to be the analysis target is described.

For example, an analysis server 3000 whose "analysis server IP address" in a line 1123 is "192.168.0.2" assumes "text contents" to be the target as an "analysis target content type". Furthermore, an analysis server 3000 whose "analysis server IP address" in a line 1124 is "192.168.0.3" assumes "image contents" to be the target as an "analysis target content type".

(2-2) Content Extraction Program Management Table

FIG. 8 is a diagram showing the content extraction program management table 1140. This is a table for managing the file formats and the contents which can be extracted to which the programs which extract contents from the files correspond.

A content extraction program name 1141 is a name for identifying the content extraction program. Although program names are described in this table, other styles of expression such as IDs may also be permitted if the programs can be uniquely identified by the information.

In an analysis target file format 1142, the file format to which the content extraction program 1150 corresponds is described. Although file format names are used in this table, other styles of expression such as file extensions and Content-type headers may also be permitted if the file types can be identified by the information.

In an extracted contents 1143, a list of contents which the content extraction program 1150 can extract is described. Although content names are described in this table, other styles of expression may also be permitted if the content types can be identified by the information.

For example, a presentation file extraction program in a line 1144 inputs presentation files and outputs text contents, table contents, image contents, and content matched data included inside the files. Similarly, a text file extraction program in a line 1145 inputs text files and outputs text contents, table contents, image contents, and content matched data. A spreadsheet file extraction program in a line 1146 inputs spreadsheet files and outputs table contents, image contents, and content matched data.

Figure 9:
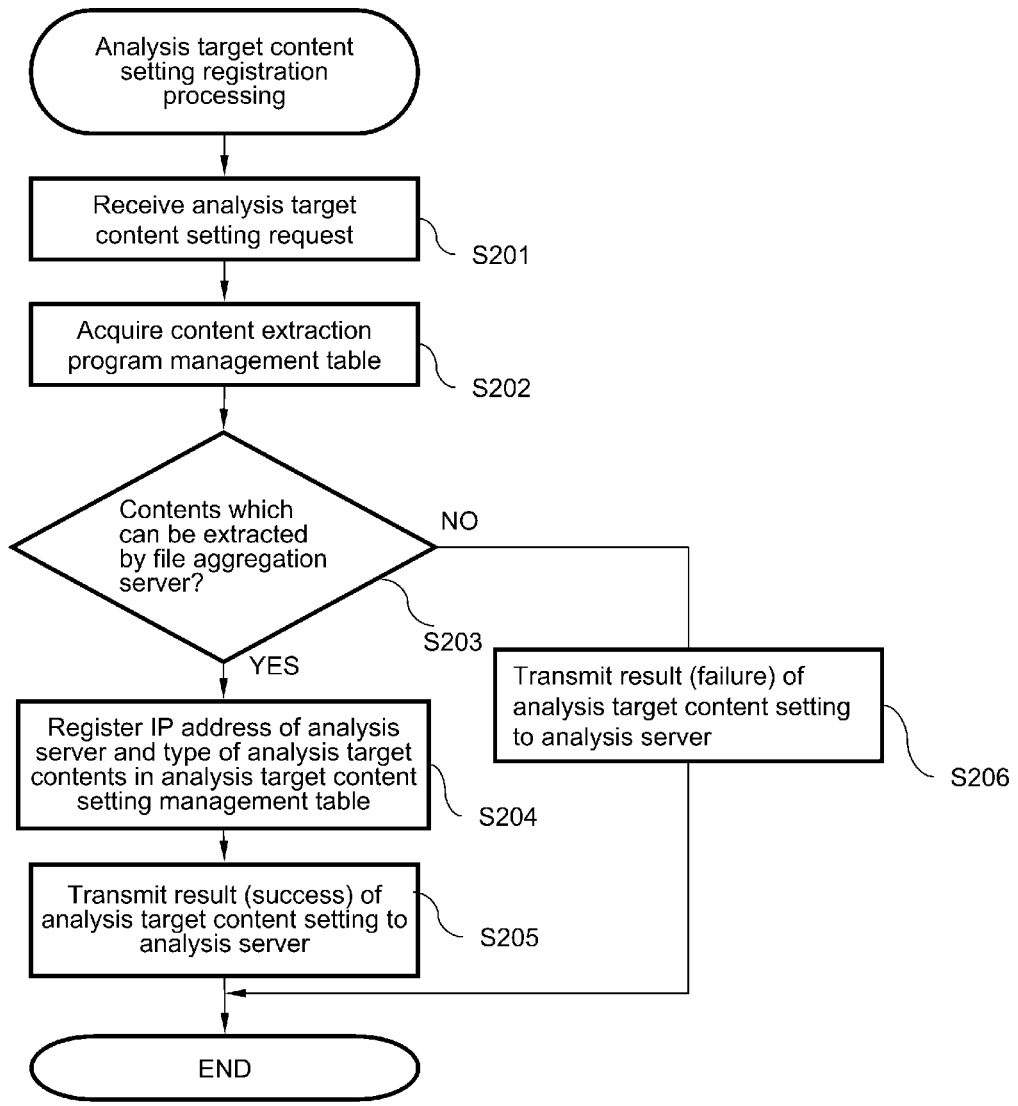
FIG. 9 is a flowchart of analysis target content setting registration processing of the present invention.

(3) Analysis Target Content Setting Registration Processing of File Aggregation Server FIG. 9 is a flowchart showing the analysis target content setting processing of the file aggregation server 1000. This analysis target content setting registration processing starts with the processing shown in processing S201 in which the analysis target content setting interface of the file aggregation server 1000 receives an analysis target content setting request from the analysis server 3000. This analysis target content setting request which the analysis target content setting interface receives includes an IP address information for identifying an analysis server 3000 and the type information of the analysis target contents. This analysis target content setting registration request may also include creation date and time range information of the files including the analysis target contents, the content extraction program 1150 which is the program of extracting the analysis target contents from the files, and others.

Next, the file aggregation server 1000 acquires the content extraction program management table 1140 in processing S202. Subsequently, in processing S203, the file aggregation server 1000 performs processing of confirming whether the type of analysis target contents described in the analysis target content setting request is described in the content extraction program management table 1140 or not and checking whether the contents can be extracted by the file aggregation server 1000 or not. If the contents can be extracted by the file aggregation server 1000, the file aggregation server 1000 proceeds to processing S204. If the contents cannot be extracted by the file aggregation server 1000, the file aggregation server 1000 proceeds to processing S206.

In processing S204, the file aggregation server 1000 registers the IP address of the analysis server 3000 and the type of analysis target contents in the analysis target content setting management table 1120. If completing this processing, the file aggregation server 1000 transmits a notification that the analysis target content setting succeeded to the analysis server 3000 in processing S205.

Meanwhile, if determining in processing S203 that the contents cannot be extracted by the file aggregation server 1000, the file aggregation server 1000 transmits a notification that the analysis target content setting has failed to the analysis server 3000 in processing S206. The analysis server 3000 which received the failure in this processing, unable to utilize the method of the present invention, acquires the files from the file aggregation server 1000 as before and extracts the analysis target contents inside the analysis server 3000.

Furthermore, although the operation received from the analysis server 3000 is described in this analysis target content setting request, this request may also be manually set (on the input device 1600) from a management screen (on the output device 1700) of the file aggregation server 1000 so that the effects of the present invention can also be applied to the analysis server 3000 which does not correspond to the method of the present invention.

(4) File Storage Processing of File Aggregation Server

Figure 10:
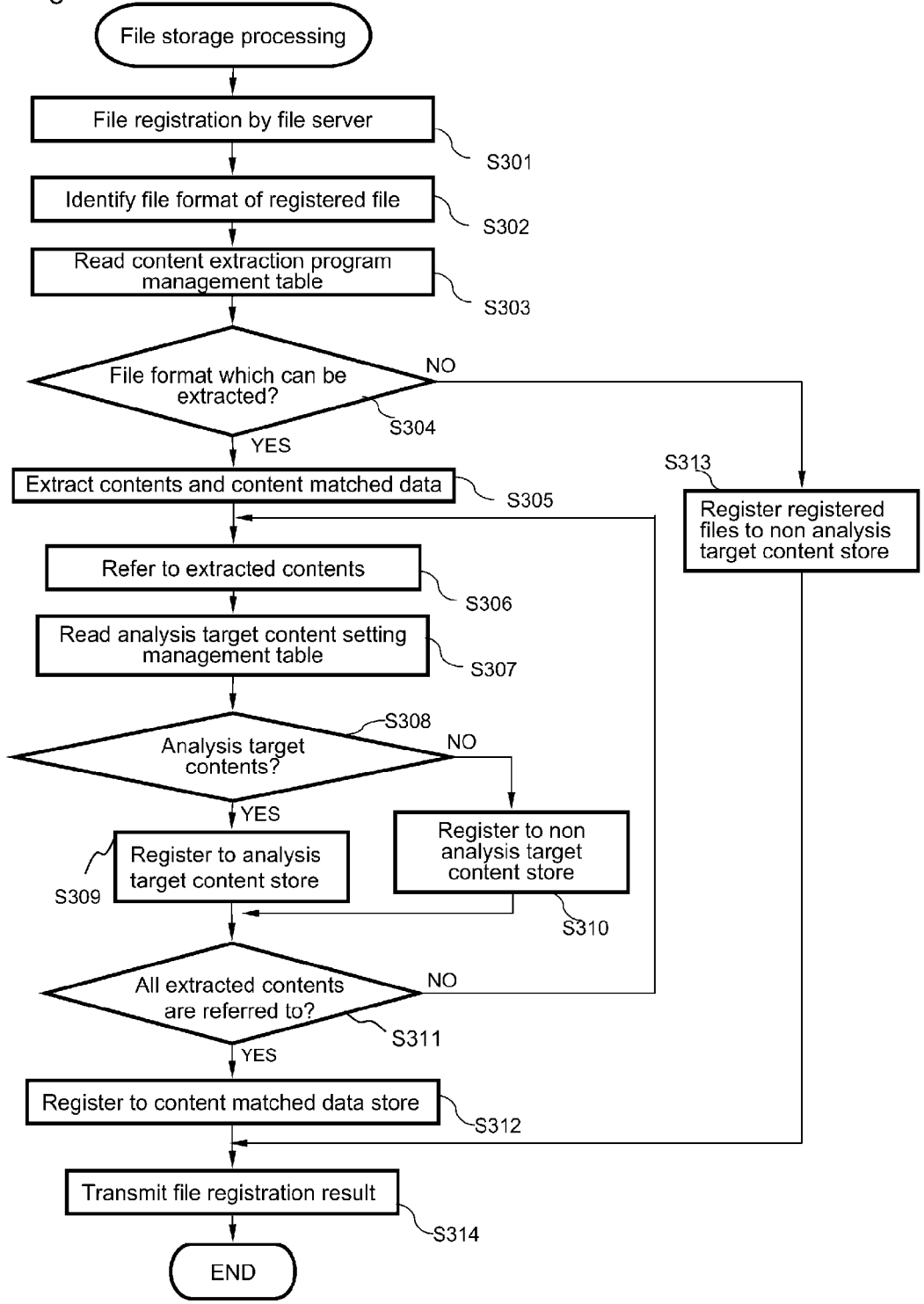
FIG. 10 is a flowchart of file storage processing of the present invention.

FIG. 10 is a flowchart showing the file storage processing of the file aggregation server 1000. This file storage processing starts with file registration by the file server 2000 in processing S301. If file registration is performed from the file server 2000, the file aggregation server 1000 identifies the file format of the registered file in processing S302.

Next, the file aggregation server 1000 reads the content extraction program management table 1140 in processing S303, and performs processing in processing S304 of checking the file format of the file with the extraction target content format 1142 of the content extraction program management table 1140 and checking whether the contents can be extracted in the file format in the file aggregation server 1000. If the contents can be extracted in the file format, the file aggregation server 1000 proceeds to processing S305. If the contents cannot be extracted in the file format, the file aggregation server 1000 proceeds to processing S313.

In processing S305, the file aggregation server 1000 extracts the contents and content matched data from the received files by using the content extraction program 1150 which is determined to be able to extract the contents. Subsequently, the file aggregation server 1000 refers to each unit of the extracted contents in processing S306, checks the contents with the analysis target content type 1122 in the analysis target content setting management table 1120 which is read in processing S307, and performs processing S308 of determining whether the contents referred to are analysis target contents or not. At this point, if the contents referred to are analysis target contents, the file aggregation server 1000 proceeds to processing S309. If the contents referred to are not analysis target contents, the file aggregation server 1000 proceeds to processing S310.

In processing S309, the file aggregation server 1000 performs processing of registering the analysis target contents referred to in the analysis target content store 1513. Meanwhile, in processing S310, the file aggregation server 1000 performs processing of registering non analysis target contents referred to in the non analysis target content store 1511. For referring to all the contents, the file aggregation server 1000 checks in processing S311 whether all the contents extracted are already referred to or not. If all the extracted contents are not already referred to, the file aggregation server 1000 returns to processing S306. Meanwhile, if all the extracted contents are already referred to, the file aggregation server 1000 proceeds to S312. In processing S312, the file aggregation server 1000 registers the extracted content matched data in the content matched data store 1512.

If determining in processing S304 that the registered file is not in the file format in which the contents can be extracted, the file aggregation server 1000 registers the registered file as is in the non analysis target content store 1511 in processing S313. Finally, the file aggregation server 1000 transmits the result whether file registration succeeded or not to the file server 2000 in processing S314.

(5) Analysis Target Content Provision Processing of File Aggregation Server

Figure 11:
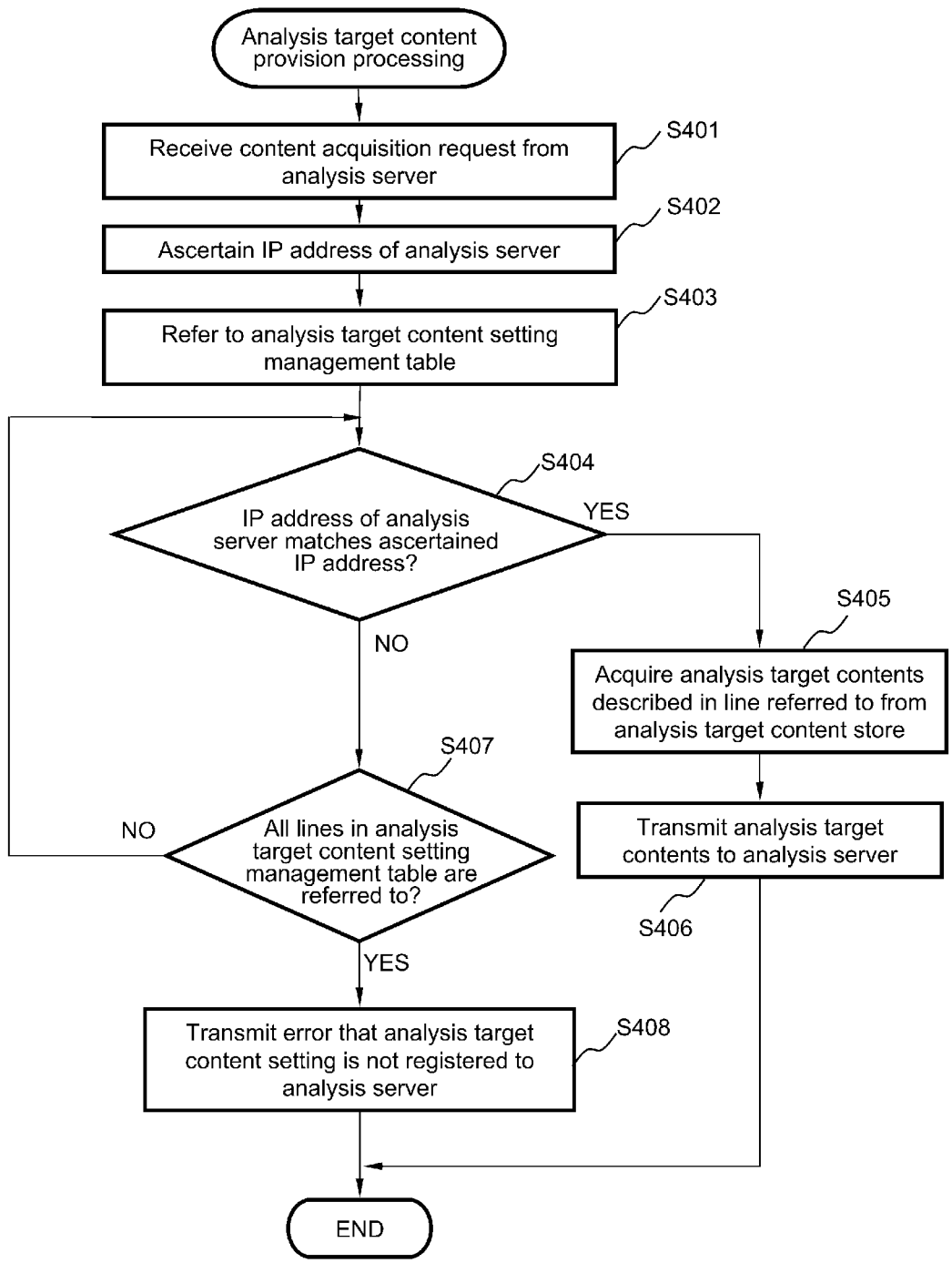
FIG. 11 is a flowchart of analysis target content provision processing of the present invention.

FIG. 11 is a flowchart showing the analysis target content provision processing of the file aggregation server 1000. This content provision processing as the analysis target starts with the processing in which the file aggregation server 1000 receives a content acquisition request from the analysis server 3000 by way of the content provision interface in the file aggregation server 1000 in processing S401. The IP address information of the analysis server 3000 is included in the content acquisition request transmitted by way of the content provision interface.

Furthermore, the type information of the analysis target contents, data compression or decompression, data encryption or decryption, data format change, and others may also be specified in the content acquisition request. If receiving a content acquisition request from the analysis server 3000, the file aggregation server 1000 ascertains the IP address of the analysis server 3000 in processing S402.

Next, the file aggregation server 1000 refers to each line of the analysis target content setting management table 1120 in processing S403 and checks whether the IP address of the analysis server 3000 in the line referred to matches the IP address of the ascertained analysis server 3000 or not in processing S404. If the IP address of the analysis server 3000 in the line referred to matches the IP address of the ascertained analysis server 3000, the file aggregation server 1000 proceeds to processing S405. If the IP address of the analysis server 3000 in the line referred to does not match the IP address of the ascertained analysis server 3000, the file aggregation server 1000 proceeds to processing S407.

In processing S405, the file aggregation server 1000 acquires the analysis target contents described in the analysis target content type 1122 in the line referred to from the analysis target content store 1513. Subsequently, the file aggregation server 1000 transmits the analysis target contents to the analysis server 3000 in processing S406. If data compression or decompression, data encryption or decryption, data format change, and others are specified in the content acquisition request in processing S401, the file aggregation server 1000 converts the data as specified and transmits the above.

Processing S407 is the processing of checking whether all the lines in the analysis target content setting management table are referred to or not. If all the lines in the analysis target content setting management table 1120 are not referred to, the file aggregation server 1000 returns to processing S403. Meanwhile, if all the lines in the analysis target content setting management table 1120 are referred to, the file aggregation server 1000 proceeds to processing S408. Processing S408 is the processing of transmitting an error to the analysis server 3000 that the analysis target content setting is not registered because no line relevant to the analysis server 3000 which is the source of the content acquisition request exists in the analysis target content setting management table 1120. However, if the analysis target content setting registration processing is performed correctly, the file aggregation server 1000 does not have to proceed to the processing S408.

As explained above, the throughput improvement of the analysis processing in the content analysis system can be achieved by the file aggregation server separately managing the analysis target contents, non analysis target contents, and the content matched data of the analysis server.

Embodiment 2

The Embodiment 2 is an embodiment whereby the analysis server 3000 can acquire analysis target contents at a high speed by way of the content provision interface by preparing a high-speed storage 4520 and a low-speed storage 4510 in a file aggregation server 4000 and locating only analysis target contents in the high-speed storage 4520 while locating non analysis target contents and content matched data in the low-speed storage 4510.

(1) Configuration of Content Analysis System

Figure 12:
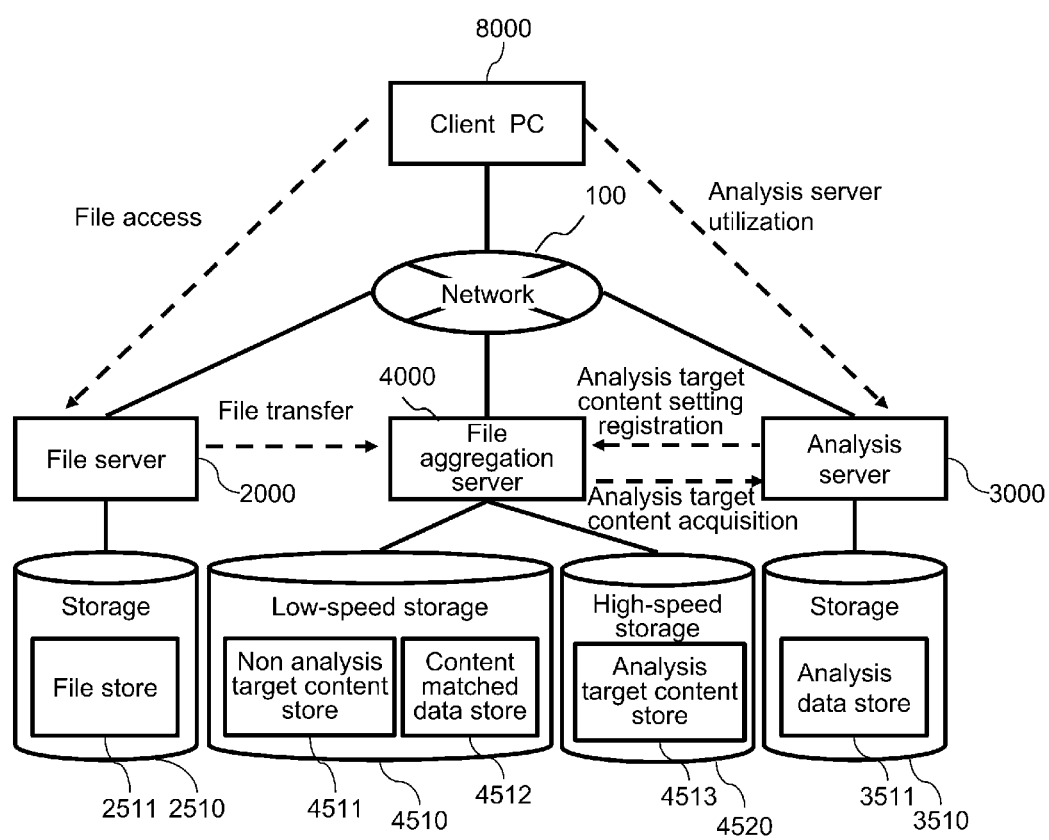
FIG. 12 is a configuration diagram of a content analysis system in the Embodiment 2 of the present invention.

FIG. 12 is the configuration of a content analysis system in the Embodiment 2. The only difference from the Embodiment 1 is storages connected to the file aggregation server 4000. In the Embodiment 1, the data area of the analysis target content store 1513, the data area of the non analysis target content store 1511, and the data area of the content matched data store 1512 are located in the single storage 1510.

Meanwhile, in the Embodiment 2, by using two storages which are a high-speed storage 4520 and a low-speed storage 4510, the data area of an analysis target content store 4513 is located in the high-speed storage 4520 while the data area of the non analysis target content store 4511 and the data area of the content matched data store 4512 are located in the low-speed storage 4510. The file aggregation server 4000 can provide analysis target contents to the analysis server 3000 at a high speed by storing the analysis target contents in the high-speed storage 4520 which performs read and write at a high-speed.

(1-1) Internal Configuration of File Aggregation Server

Figure 13:
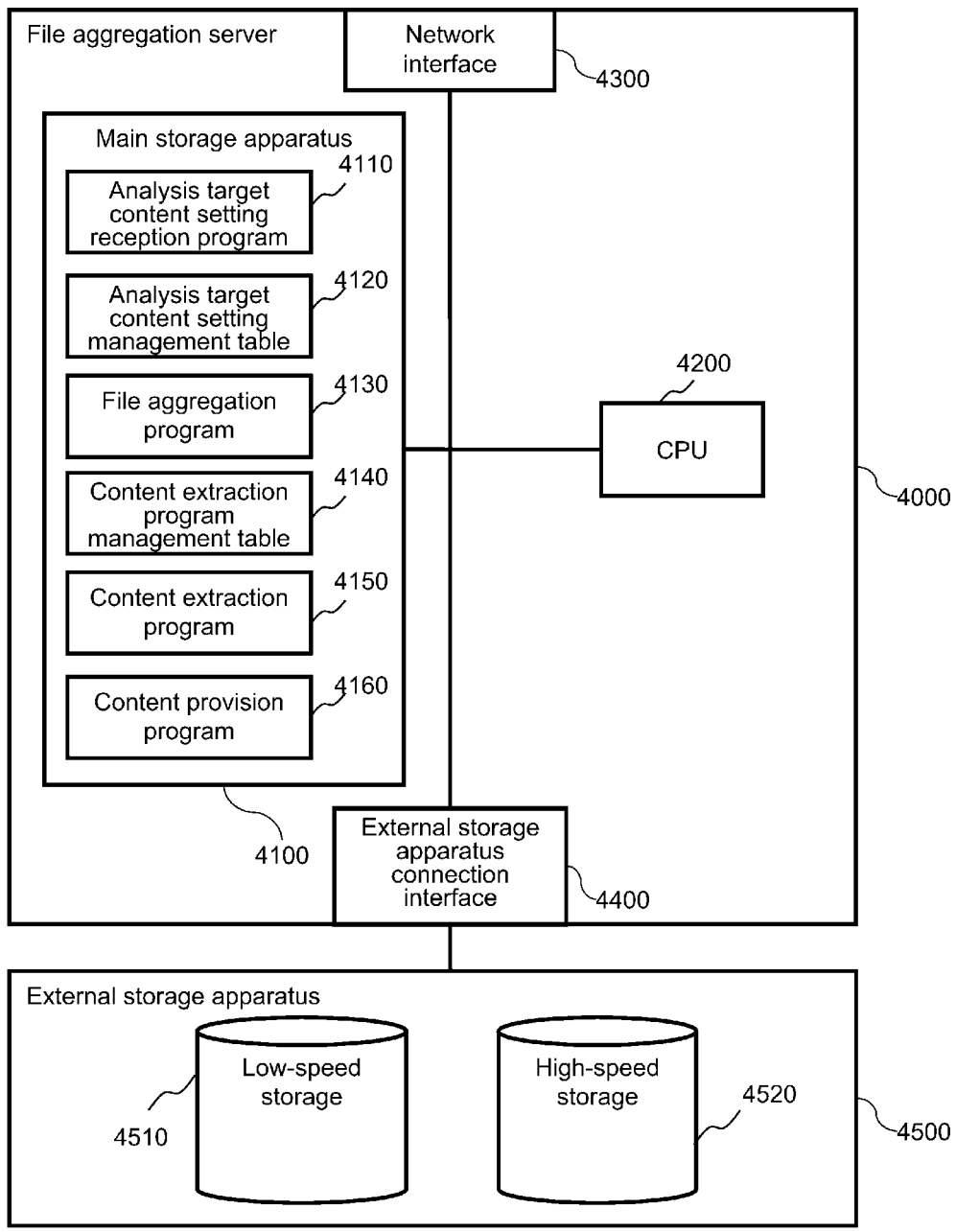
FIG. 13 is an internal configuration diagram of a file aggregation server in the Embodiment 2 of the present invention.

FIG. 13 is a diagram showing the internal configuration of the file aggregation server 4000 in the Embodiment 2. The difference from FIG. 2 which shows the internal configuration of the file aggregation server 1000 in the Embodiment 1 is that the single storage 1510 inside the external storage apparatus 1500 is replaced by the high-speed storage 4520 and the low-speed storage 4510 inside an external storage apparatus 4500. The high-speed storage 4520 is a semiconductor memory device such as an SSD (Solid State Drive) and a storage which reads data at a high speed and whose cost per bit is high, and others. Meanwhile, the low-speed storage 4510 is a storage whose data read speed and cost per bit are lower compared with the high-speed storage 4520 (for example, an SATA (Serial ATA) type HDD and a tape).

(2) File Storage Processing of File Aggregation Server

The file storage processing flowchart of the file aggregation server 4000 in the Embodiment 2 is the same as the flowchart in FIG. 10 showing the file storage processing of the file aggregation server 1000 in the Embodiment 1. However, there are characteristics specific to the Embodiment 2 in three steps of processing which are S309, S310 and S312 in FIG. 10. Specifically speaking, in the Embodiment 1, analysis target contents are stored in the analysis target content store 1513 whose data area is in the single storage 1510 in processing S309.

However, in the Embodiment 2, analysis target contents are stored in the analysis target content store 4513 whose data area is in the high-speed storage 4520. Furthermore, in the Embodiment 1, non analysis target contents are stored in the non analysis target content store 1511 whose data area is in the single storage 1510 in processing S310. However, in the Embodiment 2, non analysis target contents are stored in the non analysis target content store 4511 whose data area is in the low-speed storage 4510.

Furthermore, while content matched data is stored in the content matched data store 1512 whose data area is in the single storage 1510 in processing S312 in the Embodiment 1, content matched data is stored in the content matched data store 4512 whose data area is in the low-speed storage 4510 in the Embodiment 2.

(3) Analysis Target Content Provision Processing of File Aggregation Server

The flowchart showing the analysis target content provision processing of the file aggregation server 4000 in the Embodiment 2 is the same as the flowchart in FIG. 11 in the Embodiment 1. However, there is a characteristic specific to the Embodiment 2 in processing S405 of FIG. 11. Specifically speaking, analysis target contents are acquired from the analysis target content store 1513 whose data area is in the single storage 1510 in processing S405 in the Embodiment 1. However, analysis target contents are acquired from the analysis target content store 4513 whose data area is in the high-speed storage 4520 in the Embodiment 2. Therefore, in the Embodiment 2, it becomes possible for the analysis server 3000 to acquire analysis target contents at a higher speed than in the Embodiment 1 by using the high-speed storage 4520 which can perform read at a higher speed than the single storage 1510.

As explained above, the throughput improvement of the analysis processing in the content analysis system 3000 can be achieved as the analysis target contents can be acquired at a high speed by separately storing analysis target contents in the high-speed storage 4520 and storing non analysis target contents and content matched data in the low-speed storage 4510 in the file aggregation server 4000.

Embodiment 3

The Embodiment 3 is an embodiment whereby the analysis target content setting is also ascertained in a file server 6000 and, if files including analysis target contents are stored from the client PC 8000, the files are immediately transferred to a file aggregation server 5000. The present embodiment is an embodiment which reduces the length of time until the contents in the files created by the client PC 8000 reaches the analysis server 3000. The present embodiment can be achieved by also providing an analysis target content setting interface to the file server 6000.

(1) Configuration of Content Analysis System

Figure 14:
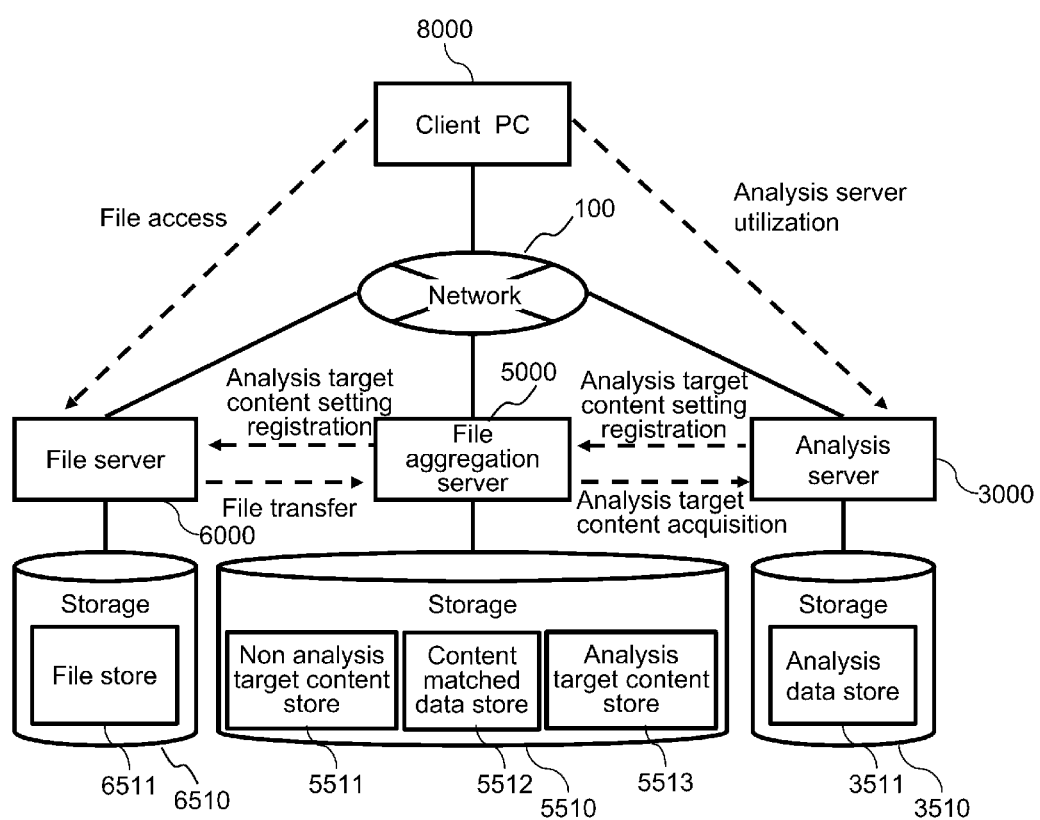
FIG. 14 is a configuration diagram of a content analysis system in the Embodiment 3 of the present invention.

FIG. 14 is a configuration diagram of a content analysis system in the Embodiment 3. The difference of the Embodiment 3 from the Embodiment 1 as to the configuration of the content analysis system is that there is processing that the file aggregation server 5000 performs analysis target content setting registration for the file server 6000. The analysis target content setting registration processing for the file server 6000 is performed by the trigger that the analysis server 3000 performs the analysis target content setting registration processing for the file aggregation server 5000. As another embodiment, the analysis server 3000 may also perform the analysis target content setting registration processing both for the file aggregation server 5000 and the file server 6000.

(1-1) Internal Configuration of File Aggregation Server

Figure 15:
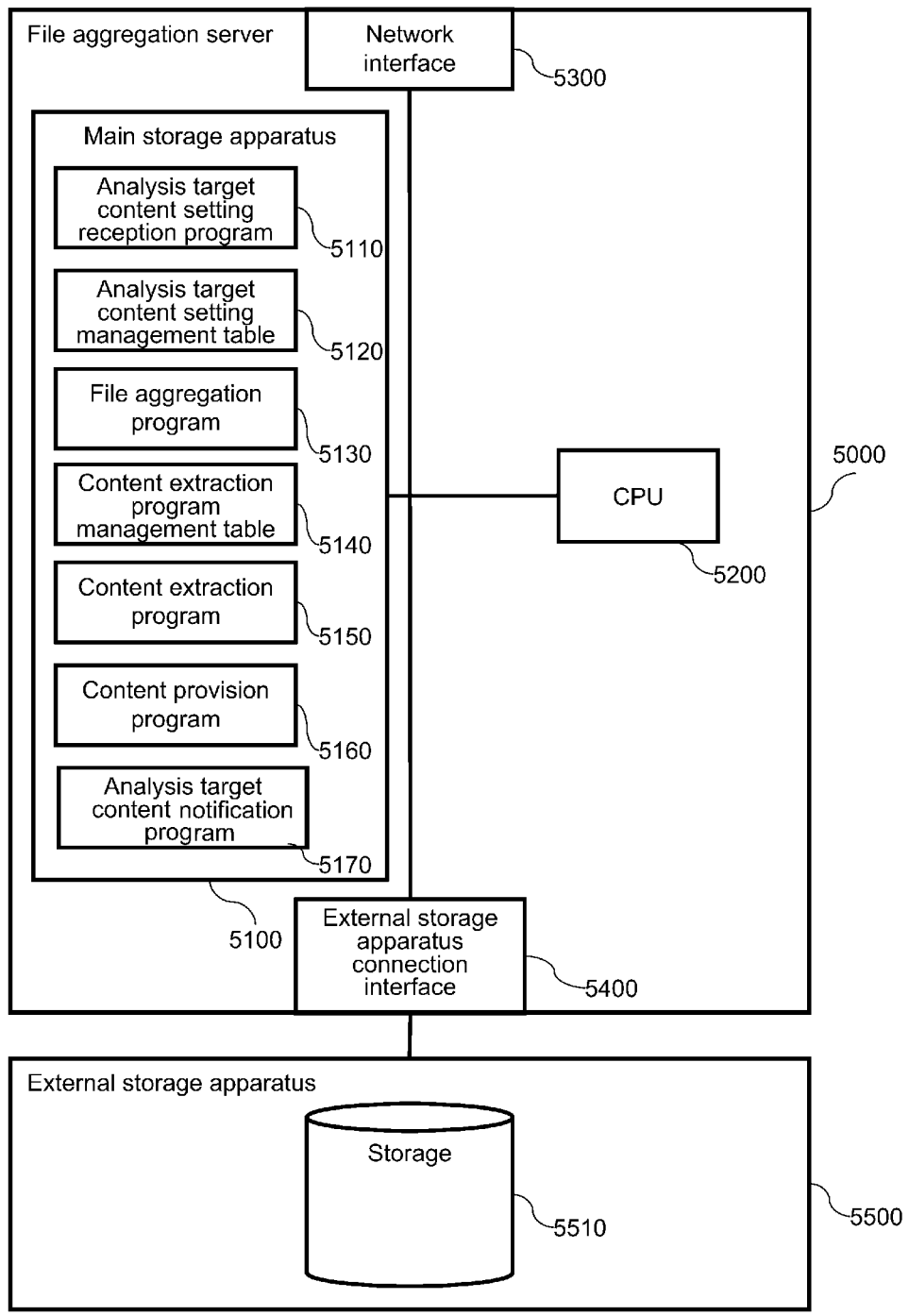
FIG. 15 is an internal configuration diagram of a file aggregation server in the Embodiment 3 of the present invention.

FIG. 15 is an internal configuration diagram of the file aggregation server 5000 in the Embodiment 3. The differences from FIG. 2 which is the internal configuration of the file aggregation server 1000 in the Embodiment 1 are the addition of an analysis target content notification program 5170 to the main storage apparatus and the specification change of a file aggregation program 5130. This analysis target content notification program 5170 performs processing of transferring the analysis target content setting which an analysis target content setting reception program 5110 received from the analysis server 3000 to the analysis target content setting interface in the file server 6000.

Furthermore, the file aggregation program 1130 in the Embodiment 1 performs pull-type file acquisition which is file acquisition from the file server 6000. However, the file aggregation program 5130 in the Embodiment 3 also corresponds to push-type file acquisition which is receiving file transfer from the file server 6000.

(1-2) Internal Configuration of File Server

Figure 16:
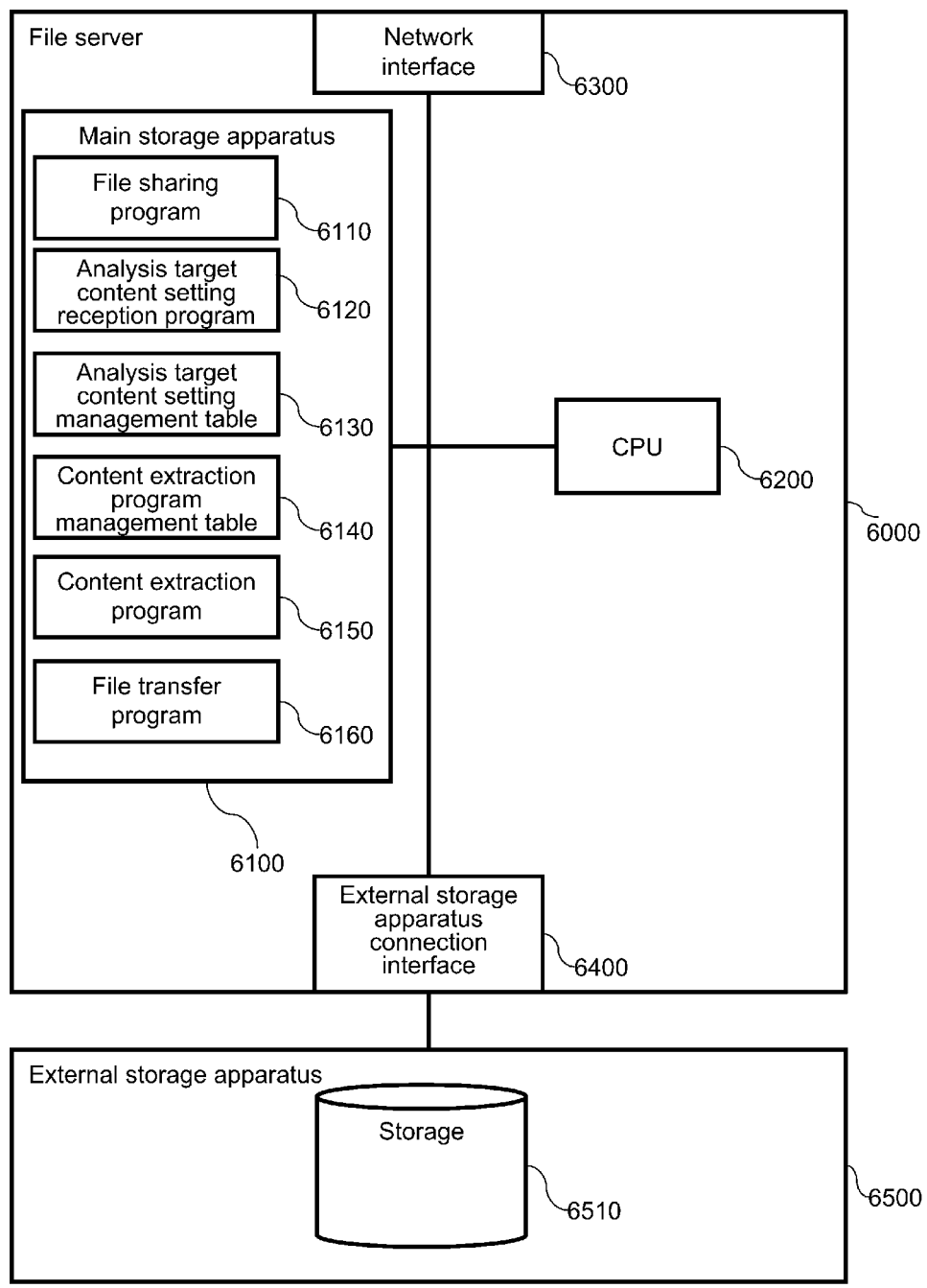
FIG. 16 is an internal configuration diagram of a file server in the Embodiment 3 of the present invention.

FIG. 16 is an internal configuration diagram of the file server 6000 in the Embodiment 3. The difference from FIG. 3 which is the internal configuration of the file server 2000 in the Embodiment 1 is that five components, that is, an analysis target content setting reception program 6120, an analysis target content setting management table 6130, a content extraction program management table 6140, a content extraction program 6150, and a file transfer program 6160 are added to the main storage apparatus 6100 of the file server 6000. Among the above, the analysis target content setting reception program 6120, the analysis target content setting management table 6130, the content extraction program management table 6140, and the content extraction program 6150 comprise the same functions as the components of FIG. 15.

The file transfer program 6160 is a program of transferring files including analysis target contents to the file aggregation server 5000. The file transfer program 6160 performs content extraction from the written files by the trigger that files are written from the client PC 8000 to the file server 6000, and determines whether the analysis target contents described in the analysis target content setting management table 6130 are included or not. If the written files include the analysis target contents, the file transfer program 6160 transfers the relevant files to the file aggregation program 5130 in the file aggregation server 5000.

(2) Operation Overview of Content Analysis System

Figure 17:
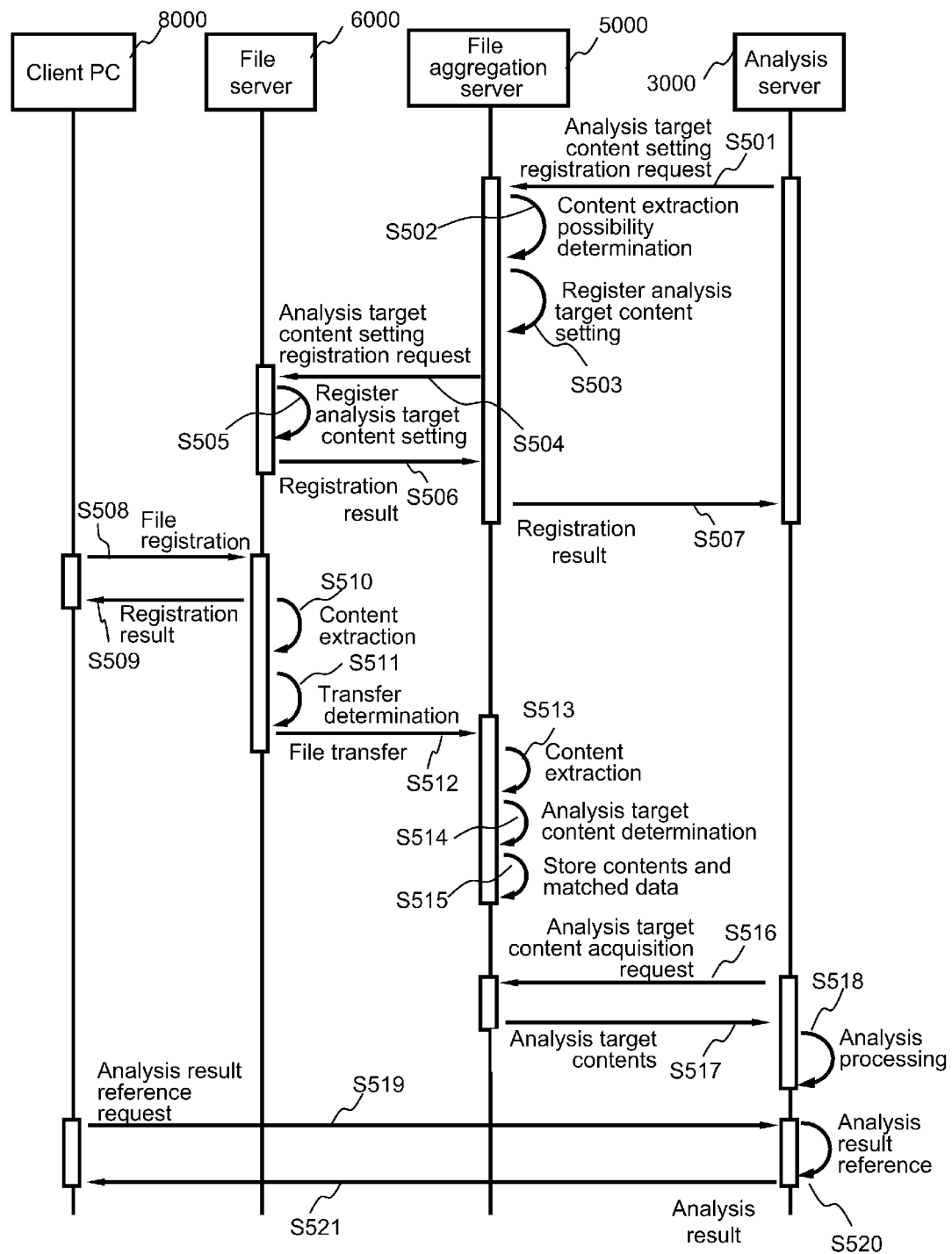
FIG. 17 is an operation sequence of the content analysis system in the Embodiment 3 of the present invention.

FIG. 17 is an operation sequence of a content analysis system configured of the client PC 8000, the file server 6000, the file aggregation server 5000, and the analysis server 3000 in the Embodiment 3. The operation sequence from processing 5501 to processing 5507 is an operation sequence in which the analysis server 3000 sets the information of the analysis target contents for the file aggregation server 5000. The difference from the processing from S101 to S104 in the Embodiment 1 is that processing 5504, 5505, and 5506 is added.

The processing 5504 is the processing in which the file aggregation server 5000 performs analysis target content setting registration for the analysis target content setting interface of the file server 6000. If analysis target content setting registration request is performed in processing 5504, the file server 6000 performs the processing of registering the analysis target content setting in the analysis target content setting management table 6130 in processing 5505, and returns the result whether registration succeeded or not to the file aggregation server 5000 in processing 5506.

Processing from 5508 to 5515 is an operation sequence until the file aggregation server 5000 stores the contents of the files created in the client PC 8000. The difference from processing from S105 to S115 in the Embodiment 1 is that processing S510 and 5511 is added and that file transfer in processing 5512 is a push-type which is independently performed by the file server 6000 and not a pull-type performed by the trigger of a file transfer request of the file aggregation server 5000.

If the client PC 8000 performs file registration for the file server 6000 in processing S508, the registration result is returned to the client PC 8000 in processing 5509. Subsequently, the file server 6000 extracts the contents from the relevant files in processing 5510. In processing 5510, the file server 6000 firstly refers to the content extraction program management table 6140 and identifies the content extraction program 6150 which can extract the contents from the relevant files.

Subsequently, the file server 6000 extracts the contents and the content matched data from the relevant files by using the content extraction program 6150 which can extract the contents. Next, the file server 6000 performs the processing of determining whether the files are the files to be transferred to the file aggregation server 5000 or not in processing 5511. In this processing, the file server 6000 checks the analysis target content setting management table 6130 with the extracted content type and, if the relevant files are the files including the analysis target contents, determines to transfer the files to the file aggregation server 5000.

Next, the file server 6000 transfers the files to the file aggregation program 5130 in the file aggregation server 5000 in processing S512. Subsequently, the file aggregation server 5000 performs processing from S513 to S515 which is the same as processing from S109 to S111 in FIG. 6. At this point, processing S513 and S514 may be omitted by transferring all or part of the contents and content matched data extracted in processing S510 in processing S512.

File processing from S516 to S518 is an operation sequence until the analysis server 3000 acquires the contents from the file aggregation server 5000 and performs the analysis processing. This processing is the same as processing from S112 to S114 in FIG. 6 of the Embodiment 1. Processing from S519 to S521 is the processing in which the client PC 8000 acquires the analysis processing result of the analysis server 3000. This processing is the same as processing from S115 to S117 in FIG. 6 of the Embodiment 1.

As explained above, file analysis (content extraction) is also possible in the file server or the analysis server in addition to the file aggregation server, and parallel extraction processing by a plurality of servers can be performed. Therefore, the throughput improvement of the analysis processing in the content analysis system can be achieved.

Embodiment 4

The Embodiment 4 is an embodiment whereby a file server 7000 uses the file aggregation server 1000 as the file backup destination and the file migration destination. Specifically, in case of using the file aggregation server 1000 as the file migration destination, if a request for a file after migration to the file aggregation server 1000 is issued from the client PC 8000 to the file server 7000, the processing of returning the file migrated to the file server 7000 is assumed to be performed.

For achieving this processing, the Embodiment 4 is characterized by that the file aggregation server 1000 which manages three data formats, that is, analysis target contents, non analysis target contents, and content matched data can provide original files before classifying the contents into the three data formats by matching the analysis target contents with the non analysis target contents by using the content matched data.

(1) Configuration of Content Analysis System

Figure 18:
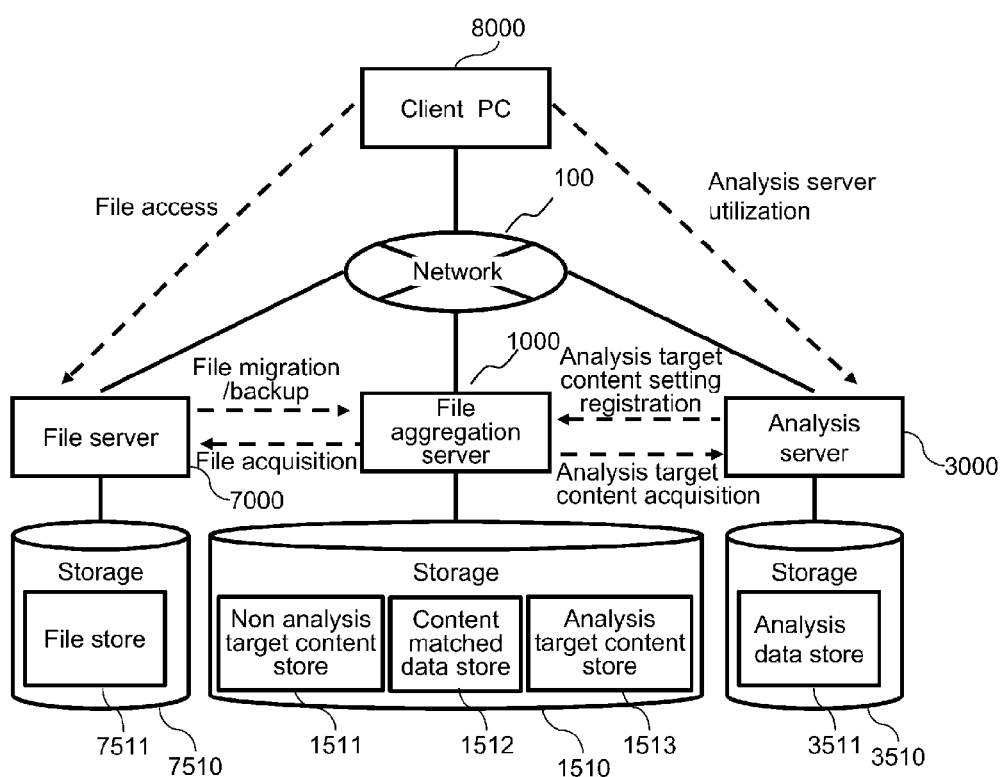
FIG. 18 is a configuration diagram of a content analysis system in the Embodiment 4 of the present invention.

FIG. 18 is a configuration diagram of a content analysis system in the Embodiment 4. The difference from the Embodiment 1 is that file transmission and reception exists between the file server 7000 and the file aggregation server 1000. The file server 7000 performs file backup and migration for the file aggregation server 1000. In this file migration, the usage capacity of the storage 7510 in the file server 7000 is reduced by performing migration of the files of low access frequencies.

If files backed up or migrated to the file aggregation server 1000 become necessary, the file server 7000 acquires the files from the file aggregation server 1000. If a file acquisition request is issued from the file server 7000, the file aggregation server 1000 generates original files by matching analysis target contents with non analysis target contents by using content matched data and returns the files.

(1-2) Internal Configuration of File Aggregation Server

The internal configuration of the file aggregation server 1000 in the Embodiment 4 is the same as FIG. 2 which is the internal configuration of the file aggregation server 1000 in the Embodiment 1. The configuration is different in that, while the content provision program 1160 only provides analysis target contents in the Embodiment 1, the original files before content extraction are provided in the Embodiment 4.

Specifically speaking, if a file acquisition request is issued from the file server 7000, the content provision program 1160 of the file aggregation server 1000 transmits the original files to the file server 7000 which are generated by matching the analysis target contents with the non analysis target contents from the relevant content matched data.

(1-3) Internal Configuration of File Server

Figure 19:
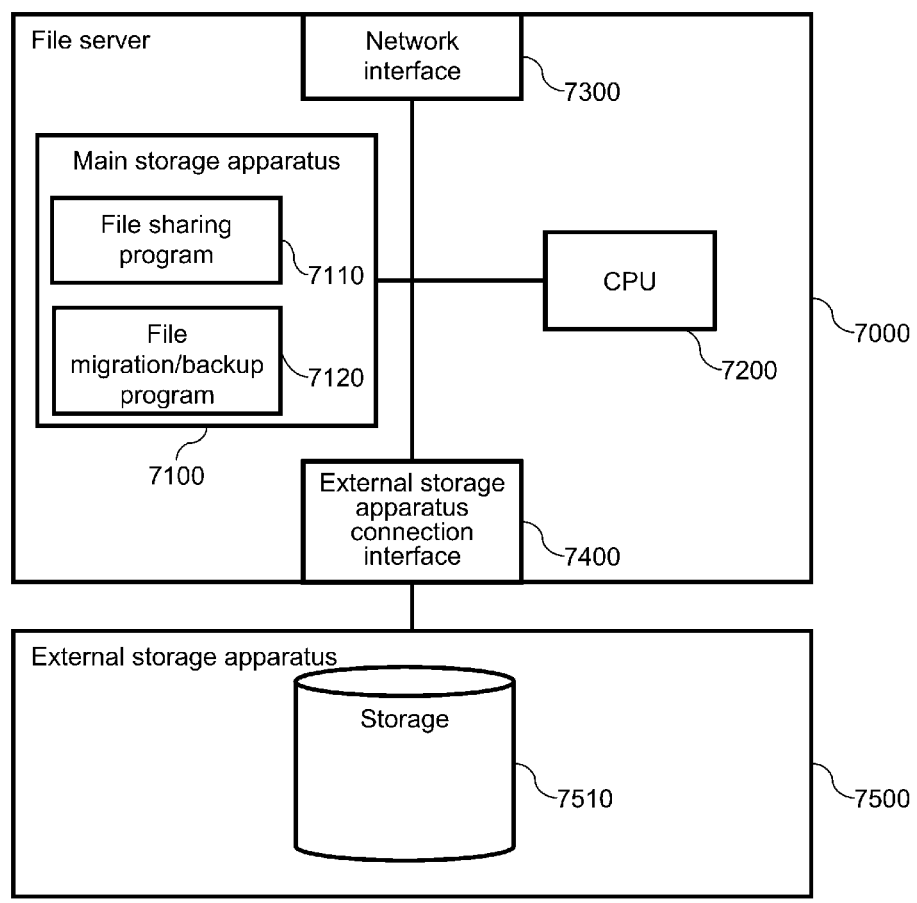
FIG. 19 is an internal configuration diagram of a file server in the Embodiment 4 of the present invention.

FIG. 19 is an internal configuration diagram of the file server 7000 in the Embodiment 4. The difference from FIG. 3 showing the internal configuration of the file server 2000 in the Embodiment 1 is that a file migration/backup program 7120 is added to the main storage apparatus. The file migration/backup program 7120 is a program which backs up files in the file server to the file aggregation server 1000 and migrates files of decreased access frequencies to the file aggregation server 1000.

Furthermore, if files backed up or migrated to the file aggregation server 1000 are requested from the client PC 8000, the file migration/backup program 7120 also comprises the function of acquiring the files from the file aggregation server 1000 and transparently providing the files to the client PC 8000.

(2) Operation Overview of Content Analysis System

FIG. 20 is an operation sequence of a content analysis system configured of the client PC 8000, the file server 7000, the file aggregation server 1000, and the analysis server 3000 in the Embodiment 4. The operation sequence from processing 5601 to processing 5604 is an operation sequence in which the analysis server 3000 sets the analysis target contents information in the file aggregation server 1000. This processing is the same as the processing from S101 to S104 in the Embodiment 1.

Processing from 5605 to 5610 is an operation sequence until the files registered from the client PC 8000 are stored in the file aggregation server 1000. The difference from processing from S105 to S115 in the Embodiment 1 is that processing S107 and S108 is replaced by processing S607. In processing S107 and S108, the file aggregation server 1000 performs pull-type file acquisition from the file server.

Meanwhile, in processing S607, the file server 7000 performs push-type file registration for the file aggregation program 1130 in the file aggregation server 1000. This file registration is performed by such triggers as regular performance and file registration by the client PC 8000.

Processing from S611 to S615 is an operation sequence in which the client PC 8000 transparently accesses the files in the file aggregation server 1000 by way of the file server 7000. If a file acquisition request is issued from the client PC 8000 in the processing S611, the file server 7000 performs processing S612 of transmitting this request to the file aggregation server 1000.

Next, if a file acquisition request is issued from the file server 7000, the file aggregation server 1000 performs processing S613 of creating original files by matching the contents. In this processing, the file aggregation server 1000 acquires the content matched data relevant to the files from the content matched data store 1512 and acquires the analysis target contents and non analysis target contents which are described in the content matched data from the analysis target content store 1513 and the non analysis target content store 1511 respectively.

Subsequently, the file aggregation server 1000 creates the original files by matching the analysis target contents with the non analysis target contents based on the content matched data. However, if a request is issued for the files stored in the file format exceptionally in the non analysis target content store 1511 in processing S313 of the file storage processing, the file aggregation server 1000 acquires the files in the analysis target contents as is in processing S613. The original files created in the file aggregation server 1000 are transmitted to the client PC 8000 by way of processing S614 and S615.

Processing from S616 to S618 is an operation sequence until the analysis server 3000 acquires the contents from the file aggregation server 1000 and performs the analysis processing. Processing from S616 to S618 is the same as processing from S112 to S113 in the Embodiment 1. Processing from S619 to S621 is the processing in which the client PC 8000 acquires the analysis result of the analysis server 3000. Processing from S619 to S621 is the same as processing from S115 to S117 in the Embodiment 1.

As explained above, in the present invention, the throughput improvement of the analysis processing in the content analysis system can be achieved by the file aggregation server separately managing analysis target contents, non analysis target contents, and content matched data of the analysis server.

Furthermore, for further improving the throughput of the analysis processing, the above-mentioned four embodiments may also be used in combination. For example, the throughput of the analysis processing can be further improved by combining the Embodiment 2 and the Embodiment 3 or combining the Embodiment 2 and the Embodiment 4.

INDUSTRIAL APPLICABILITY

The present invention can be applied to such information processing apparatuses as a large computer, a server and a personal computer, such information and image storage apparatuses as a storage system and an HDD recorder, and such communication apparatuses as a cell phone.

REFERENCE SIGNS LIST

100 Network
1000, 4000, 5000 File aggregation server
1100, 2100, 3100, 4100, 5100, 6100, 7100, 8100 Main storage apparatus
1110, 4110, 5110, 6120 Analysis target content setting reception program
1120, 4120, 5120, 6130 Analysis target content setting management table
1121 Analysis server IP address
1122 Analysis target content type
1130, 4130, 5130 File aggregation program
1140, 4140, 5140, 6140 Content extraction program management table
1141 Content extraction program name
1142 Extraction target file format 1143 Extracted contents
1150, 4150, 5150, 6150 Content extraction program
1160, 4160, 5160 Content provision program
1200, 2200, 3200, 4200, 5200, 6200, 7200, 8200 CPU
1300, 2300, 3300, 4300, 5300, 6300, 7300, 8300 Network interface
1400, 2400, 3400, 4400, 5400, 6400, 7400, 8400 External storage apparatus connection interface
1500, 2500, 3500, 4500, 5500, 6500, 7500, 8500 External storage apparatus
1510, 2510, 3510, 5510, 6510, 7510, 8510 Storage
1511, 4511, 5511 Non analysis target content store
1512, 4512, 5512 Content matched data store
1513, 4513, 5513 Analysis target content store
1600 Input device
1700 Output device
2000, 6000, 7000 File server
2110, 6110, 7110 File sharing program
2511, 6511, 7511 File store
3000 Analysis server
3110 Analysis target content setting registration program
3120 Analysis target content acquisition program
3130 Analysis data creation program
3140 Analysis data reference program
3511 Analysis data store
4510 Low-speed storage
4520 High-speed storage
5170 Analysis target content notification program
6160 File transfer program
7120 File migration/backup program
8000 Client PC
8110 File server access program
8120 Analysis server access program

The invention claimed is:

1. An information processing system comprising a file server coupled to a terminal, a file aggregation server coupled to the file server, and an analysis server coupled to the file aggregation server;
the file server including at least one of a setting interface and a content provision interface that couples the file server to the file aggregation server;
wherein the file aggregation server is composed of:
a control unit;
a storage unit;
an input unit; and
an output unit;
wherein classification of content information of a file is performed via one of the file aggregation server, the file server and the analysis server such that the content information of the file is classified into:
(D1) analysis target content information;
(D2) non analysis target content information; and
(D3) content matched data;
and the classified information is stored into an external storage unit, wherein the analysis server acquires at least one of the content information classified into (D1) through (D3) based on provision information from the content provision interface; and
wherein the external storage unit of the file aggregation server is composed of a high-speed storage and a low-speed storage, wherein the high-speed storage stores the (D1) analysis target content information and the low-speed storage stores the (D2) non analysis target content information and the (D3) content matched information.

2. The information processing system according to claim 1, wherein the setting interface has at least one or more of the following functions:

(F11) setting types of analysis target contents;
(F12) setting a method for extracting contents;
(F13) setting information of the analysis server;
(F14) a function of instructing extraction via the analysis server when contents or file format data cannot be extracted via the file aggregation server; and
(F15) a function of instructing content extraction via the analysis server.

3. The information processing system according to claim 2, wherein the information of the analysis server set by (F13) is identification information.

4. The information processing system according to claim 1, wherein the setting interface has at least one or more of the following functions:
(F21) a function of designating a type of analysis target contents;
(F22) a function of acquiring analysis target contents;
(F23) a function of specifying an acquisition format of analysis target contents;
(F24) a function of acquiring content matched data; and
(F25) a function of acquiring an original file whose data was aggregated from the file server.

5. The information processing system according to claim 4, wherein the acquisition format of (F23) can either be compressed or be subjected to file type change.

6. The information processing system according to claim 1, wherein the content information of the file is classified using at least one or more of the following:
(P1) an analysis target content setting reception program;
(P2) an analysis target content setting management table;
(P3) a file aggregation program;
(P4) a content extraction program management table;
(P5) a content extraction program;
(P6) a content provision program;
(P7) an analysis target content setting notification program;
(P8) a file sharing program; and
(P9) a file transfer program.

7. The information processing system according to claim 1, wherein the (D1) analysis target content information is a content information of a text file including a text data format, and the (D2) non analysis target content information is a content information other than (D1).

8. The information processing system according to claim 7, wherein the analysis server creates an index of the text file based on the (D1) content information of a text file including a text data format.

9. The information processing system according to claim 1, wherein an original file can be restored using the (D3) content matched information.

10. The information processing system according to claim 1, wherein registered setting information and provision information is transferrable among the analysis server, the file aggregation server and the file server.

11. A method of information processing for a system including a file server coupled to a terminal, a file aggregation server coupled to the file server, and an analysis server coupled to the file aggregation server, the method comprising:
classifying content information of a file using one of the file aggregation server, the file server and the analysis server into:
(D1) analysis target content information;
(D2) non analysis target content information; and
(D3) content matched data;
storing the classified information into an external storage unit, wherein the analysis server acquires at least one of the content information classified into (D1) through (D3) based on provision information from a content provision interface; and wherein the external storage unit of the file aggregation server is composed of a high-speed storage and a low-speed storage, wherein the (D1) analysis target content information is stored in the high-speed storage stores and the (D2) non analysis target content information and the (D3) content matched information is stored in the low-speed storage.

* * * * *